US012284932B2

(12) United States Patent
Hammes et al.

(10) Patent No.: US 12,284,932 B2
(45) Date of Patent: Apr. 29, 2025

(54) FRONT-FOLDING TOOLBAR

(71) Applicant: AgSynergy, LLC, Seneca, KS (US)

(72) Inventors: Ryan J. Hammes, Seneca, KS (US); David J. Lueger, Seneca, KS (US); Stephen A. Youngers, Clearwater, KS (US)

(73) Assignee: AgSynergy, LLC, Seneca, KS (US)

( * ) Notice: Subject to any disclaimer, the term of this patent is extended or adjusted under 35 U.S.C. 154(b) by 0 days.

(21) Appl. No.: 18/799,130

(22) Filed: Aug. 9, 2024

(65) Prior Publication Data
US 2025/0048954 A1    Feb. 13, 2025

Related U.S. Application Data

(60) Provisional application No. 63/518,981, filed on Aug. 11, 2023.

(51) Int. Cl.
A01B 73/06    (2006.01)
A01B 73/04    (2006.01)
A01C 15/00    (2006.01)

(52) U.S. Cl.
CPC .......... A01B 73/065 (2013.01); A01B 73/046 (2013.01); A01C 15/005 (2013.01)

(58) Field of Classification Search
CPC .... A01B 73/065; A01B 73/046; A01C 15/005
See application file for complete search history.

(56) References Cited

U.S. PATENT DOCUMENTS

| 4,664,202 | A |   | 5/1987 | Applequist et al. |   |
|---|---|---|---|---|---|
| 4,723,787 | A | * | 2/1988 | Hadley et al. | A01B 73/065 280/412 |
| 5,113,956 | A | * | 5/1992 | Friesen et al. | A01B 73/065 280/491.2 |
| 6,076,613 | A | * | 6/2000 | Frasier | A01B 73/065 172/776 |
| 6,702,035 | B1 | * | 3/2004 | Friesen | A01B 73/065 172/311 |

(Continued)

FOREIGN PATENT DOCUMENTS

KR    100779449 B1    11/2007

OTHER PUBLICATIONS

International Search Report and Written Opinion dated Nov. 18, 2024, in corresponding PCT/US2024/041659, 11 pages.
Machine Translation of KR100779449, 6 pages.

Primary Examiner — Christopher J Sebesta
Assistant Examiner — Joel F. Mitchell
(74) Attorney, Agent, or Firm — HOVEY WILLIAMS LLP

(57) ABSTRACT

An agricultural implement configured to be propelled by a prime mover. The implement comprises a toolbar configured to support a plurality of agricultural tools. The toolbar is a front-folding toolbar configured to be shifted forward from an operational position to a transport position. The implement further comprises a draw-bar extending forward from the toolbar and configured to be coupled with the prime mover. The draw-bar is rotatably connected with the toolbar via a connection assembly that presents a generally laterally extending rotational axis, such that the draw-bar is configured to rotate vertically about the rotational axis.

20 Claims, 23 Drawing Sheets

(56) References Cited

U.S. PATENT DOCUMENTS

| | | | |
|---|---|---|---|
| 7,712,544 B1 * | 5/2010 | Misenhelder et al. | ........................ A01B 73/065 172/311 |
| 8,127,861 B2 * | 3/2012 | Meek | ................... A01B 73/065 172/311 |
| 8,893,629 B2 * | 11/2014 | Ryder et al. | ........... A01C 7/102 111/900 |
| 2010/0314144 A1 | 12/2010 | Hennes | |
| 2019/0380253 A1 | 12/2019 | Thielicke et al. | |

\* cited by examiner

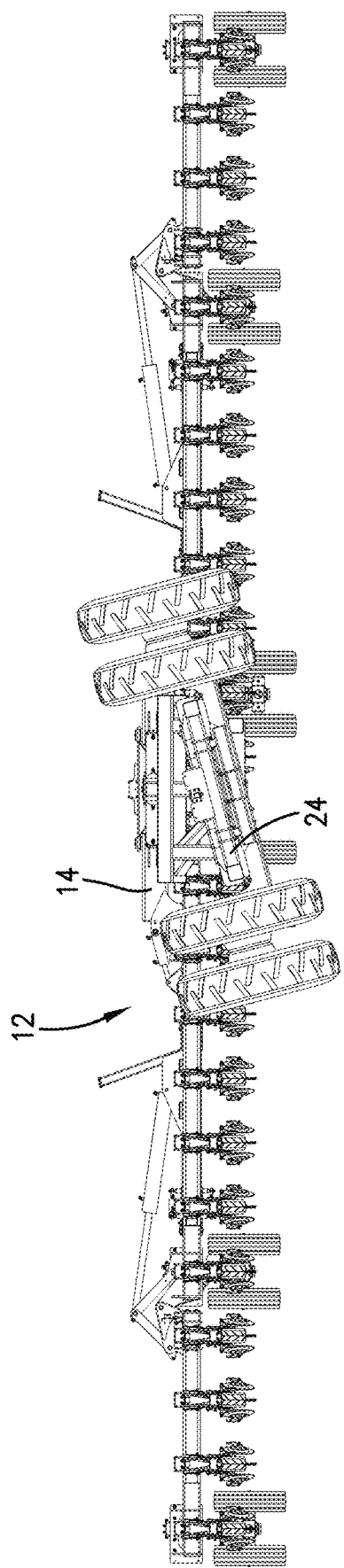

FRONT-FOLDING TOOLBAR

CROSS-REFERENCE TO RELATED APPLICATION

The present non-provisional patent application claims priority benefit to U.S. Provisional Patent Application Ser. No. 63/518,981, filed on Aug. 11, 2023, and entitled "FRONT-FOLDING TOOLBAR." The entirety of the above-identified provisional patent application is hereby incorporated by reference into the present non-provisional patent application.

FIELD OF THE INVENTION

Embodiments of the present invention are generally directed to agricultural implements with toolbars. More particularly, embodiments of the present invention are directed to agricultural implements with toolbars particularly configured with connection assemblies or joints that permit the toolbar to efficiently follow the contours of various types of terrain while minimizing stresses and strains experienced by the agricultural implement.

BACKGROUND OF THE INVENTION

Agricultural implements with toolbars that support a plurality of agricultural tools have been used for decades. However, given the size and weight of such implements, the implements are generally quite rigid and do not function as efficiently and precisely as possible. For example, large, rigid implements being used over undulating fields have difficulty in precisely following the contours of the fields. Furthermore, movement of the implements over such undulating terrain can cause unwanted stresses and strains on the implements, as well as on the prime movers (e.g., tractors) that propel the implements.

In view of the above, it would be beneficial if agricultural implements with toolbars could be formed with appropriate configurations of connection assemblies that would permit the implements to precisely follow the contours of terrain, while minimizing stresses and strains imparted on the implements and on the prime movers propelling the implements.

SUMMARY OF THE INVENTION

In one embodiment of the present invention, there is provided an agricultural implement configured to be propelled by a prime mover. The implement comprises a toolbar configured to support a plurality of agricultural tools. The toolbar is a front-folding toolbar configured to be shifted forward from an operational position to a transport position. The implement further comprises a draw-bar extending forward from the toolbar and configured to be coupled with the prime mover. The draw-bar is rotatably connected with the toolbar via a connection assembly that presents a generally laterally extending rotational axis, such that the draw-bar is configured to rotate vertically about the rotational axis.

Embodiments of the present invention further include an agricultural implement configured to be propelled by a prime mover. The implement comprises a toolbar configured to support a plurality of agricultural tools. The toolbar is a front-folding toolbar configured to be shifted forward from an operational position to a transport position. The toolbar comprises a left wing section, a right wing section, and a center section. Each of the left wing section and the right wing section is configured to rotate vertically with respect to the center section about respective rotational axes. The implement further includes a draw-bar extending forward from the toolbar and configured to be coupled with the prime mover. The draw-bar is rotatably connected with the toolbar via a connection assembly that includes a generally laterally extending rotational axis, such that the draw-bar is configured to rotate vertically about the rotational axis. The rotational axes of the wing sections of the toolbar and the rotational axis of the draw-bar are colinear when the toolbar is in the transport position.

Embodiments of the present invention further comprise a method of operating an agricultural implement comprising a toolbar supporting a plurality of tools and a draw-bar extending forward from the toolbar. The method comprises a number of steps. One step includes connecting the implement with a prime mover by engaging a coupler of the draw-bar with the prime mover. An additional step includes pulling the implement through a field using the prime mover. The pulling step is performed with the toolbar in an operational position such that left and right wing sections of the toolbar extend generally laterally from a center section of the toolbar. An additional step includes shifting the toolbar from the operational position to a transport position such that the left and right wing sections extend generally forward from the center section of the toolbar. A further step includes pulling the implement using the prime mover. The pulling step is performed with the toolbar in the transport position, and during the pulling step each of the left and right wing sections and the draw-bar are configured to rotate vertically with respect to the center section of the toolbar.

Embodiments of the present invention further comprise an agricultural implement configured to be propelled by a prime mover. The implement comprises a toolbar configured to support a plurality of agricultural tools. The toolbar is a front-folding toolbar configured to be shifted forward and/or rearward. The implement additionally comprises a draw-bar extending forward from the toolbar and configured to be coupled with the prime mover. The draw-bar is rotatably connected with the toolbar such that the draw-bar is configured to rotate upward and downward with respect to the toolbar. The implement further comprises a support linkage extending between the draw-bar and the toolbar. The support linkage is configured such that when the draw-bar rotates upward and/or downward, the support linkage causes a corresponding forward and/or rearward shifting of the toolbar.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 23 is a rear elevation view of the implement from FIGS. 3-5, with a tank removed from a cart to illustrate the cart being configured to rotate with respect to a center section of the toolbar.

Figure 1:
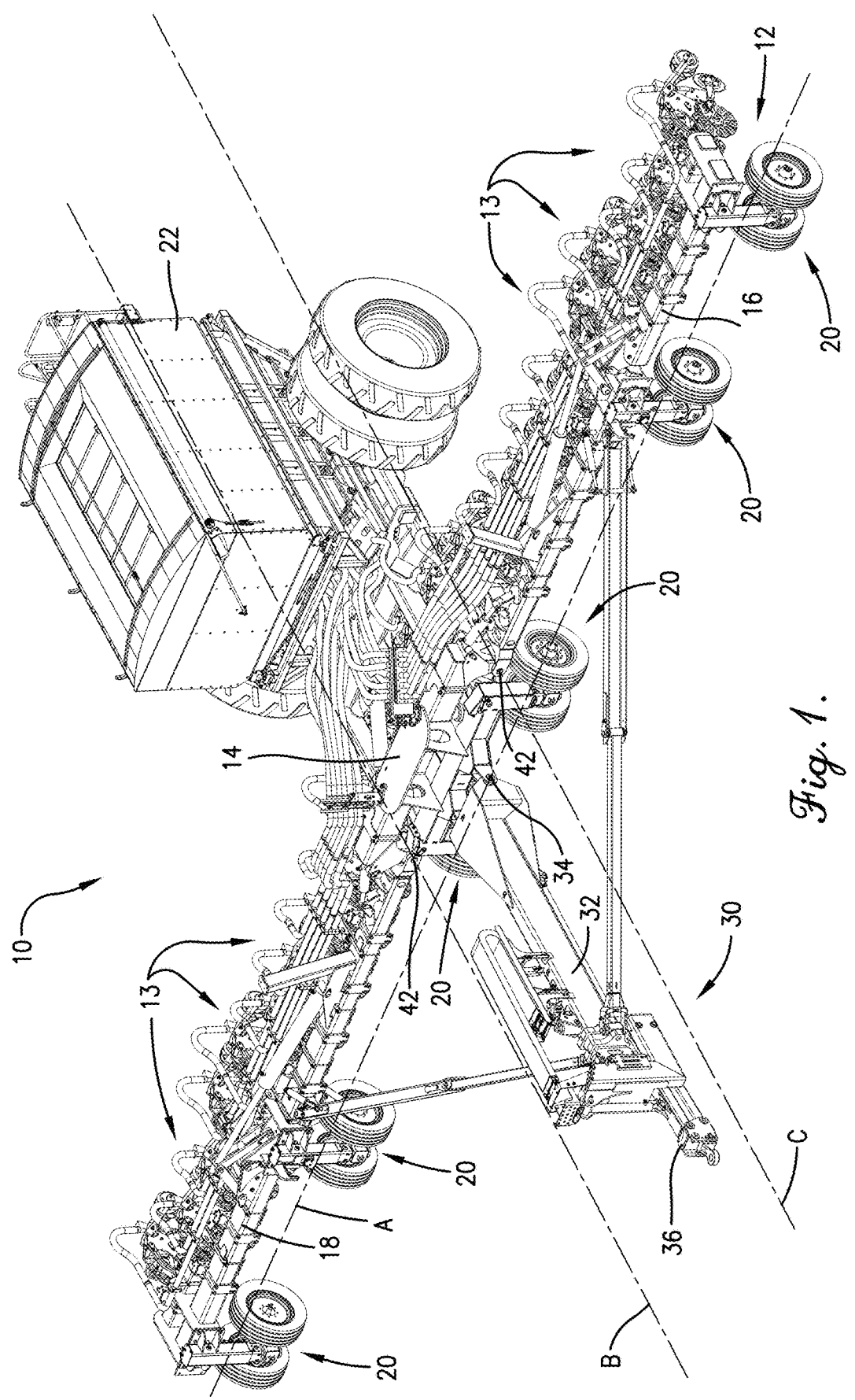
FIG. 1 is a front perspective view of an implement with a front-folding toolbar according to embodiments of the present invention, with the toolbar extended in the operational position.

The figures are not intended to limit the present invention to the specific embodiments they depict. While the drawings do not necessarily provide exact dimensions or tolerances for the illustrated structures or components, the drawings are not to scale with respect to the relationships between the components of the structures illustrated in the drawings.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Figure 2:
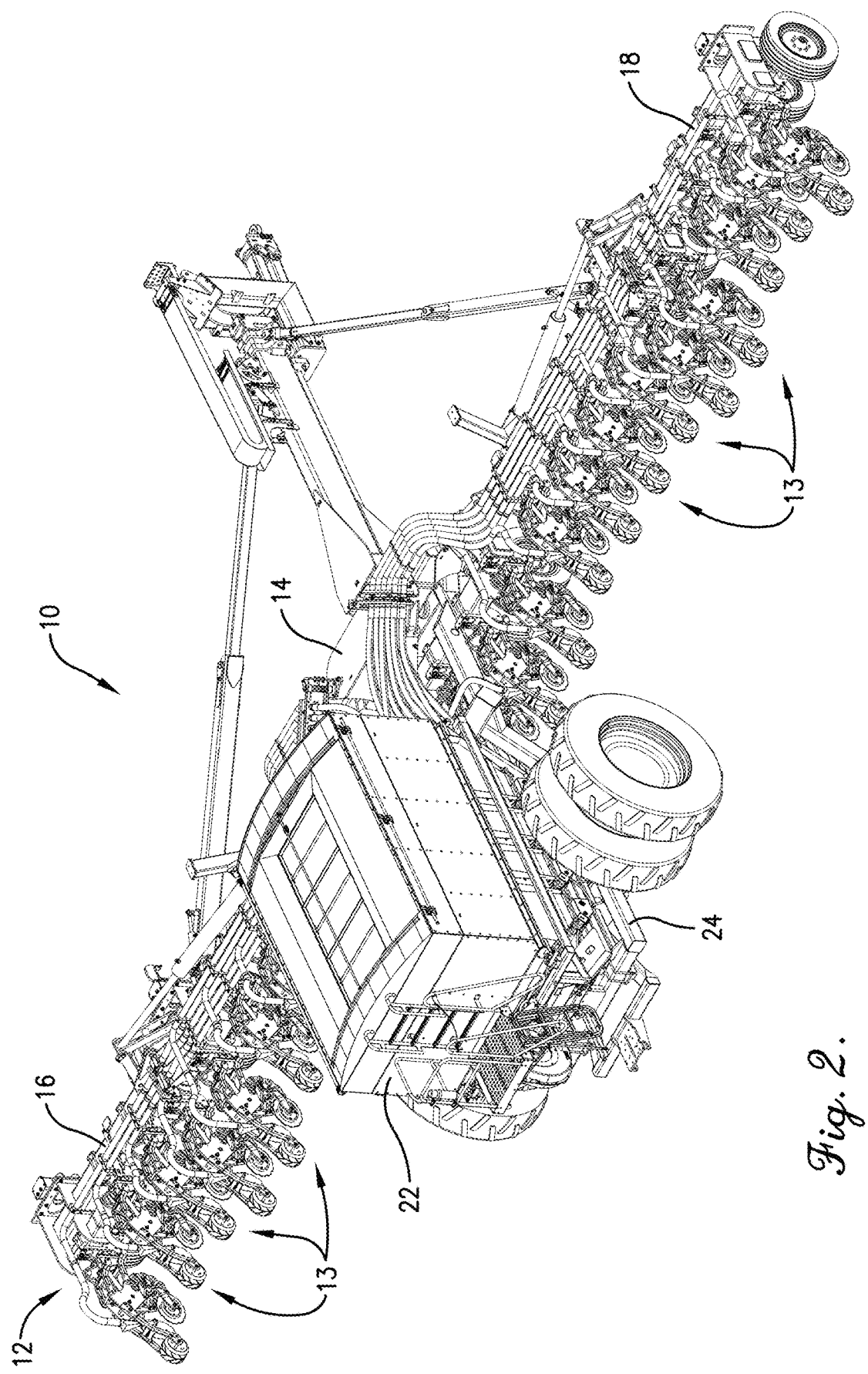
FIG. 2 is a rear perspective view of the implement from FIG. 1.
Figure 3:
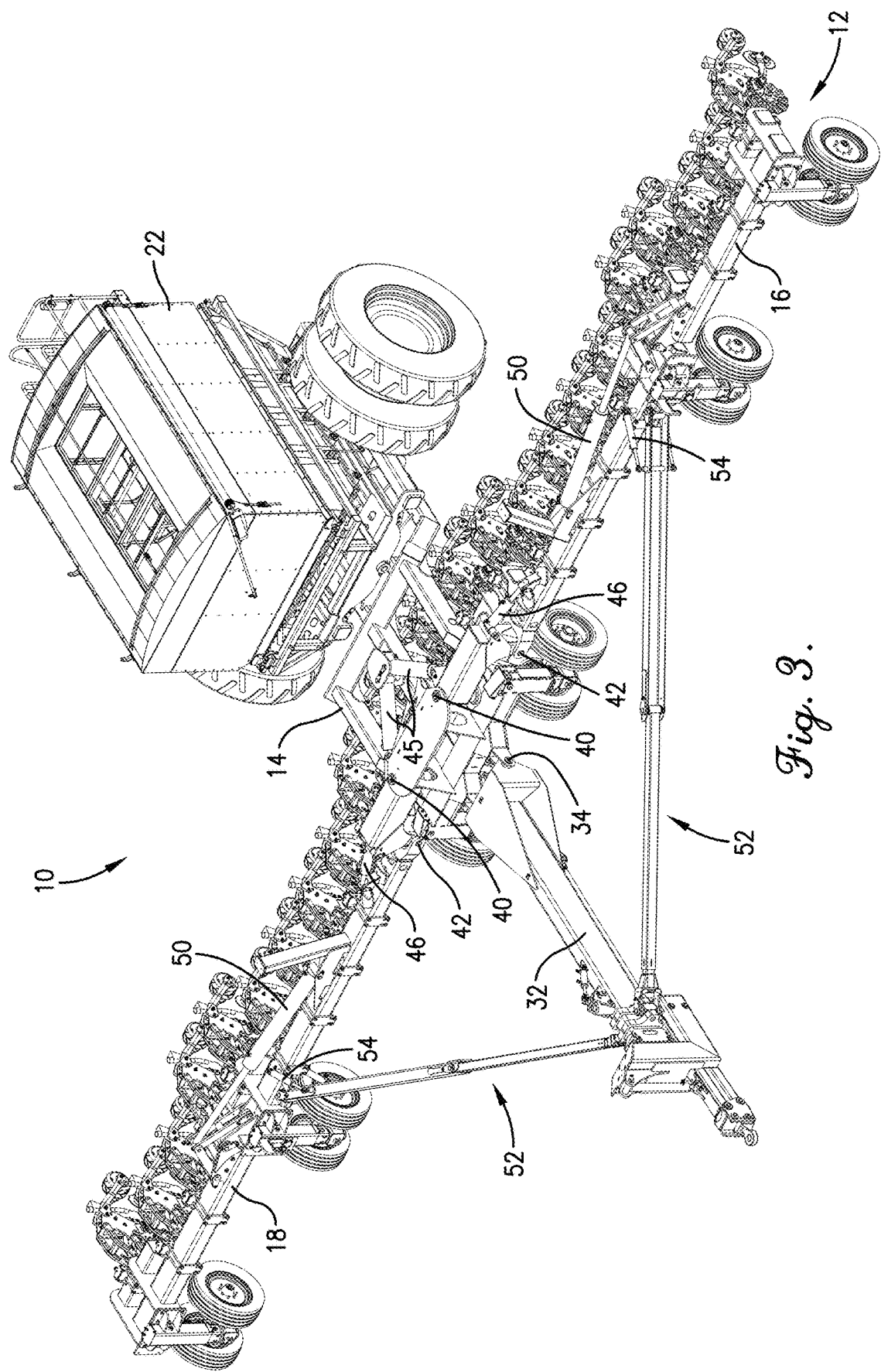
FIG. 3 is another front perspective view of the implement from FIGS. 1 and 2, with conduits that operably connect a tank to agricultural tools of the implement removed.

Broadly, embodiments of the present invention are directed to an implement for performing agricultural operations. As illustrated in FIGS. 1-3, the implement 10 may comprise a nutrient applicator configured to deposit fertilizer or other crop/soil nutrients into the ground. However, it should be understood that the implement 10 may comprise various other types of agricultural implements, such as seeders, tillage implements, or the like. Regardless, the implement 10 may comprise a toolbar 12 that extends across a width of the implement 10 and supports a plurality of tools 13 (see, e.g., FIG. 2) along the length of the toolbar 12. The toolbar 12 may comprise a center section 14, a left wing section 16, and a right wing section 18. As will be described in more detail below, the positions of the left and right wing sections 16, 18 may be shiftable with respect to the center section 14. In some embodiments, each of the center section 14, the left wing section 16, and the right wing section 18 may be supported on and/or above the ground by one or more wheel assemblies 20 (see, e.g., FIG. 1) that allow the implement 10 to roll across the ground surface. As such, each of the center section 14, the left wing section 16, and the right wing section 18 may be associated with and, thereby supported on and/or above the ground by one or more of their own, separate wheel assemblies 20.

The plurality of tools 13 may be mounted to (e.g., extending beneath) each of the center section 14, the left wing section 16, and the right wing section 18 of the toolbar 12. Where, for example, when the implement 10 is a nutrient applicator, the tools 13 may be configured as row units with ground-engaging tools that comprise furrow openers. As such, the tools 13 may be configured to form furrows in the ground and to deposit nutrients into such furrows and into the soil. The nutrients may be supplied to the tools 13 from a tank 22 that is supported by a cart 24 (see, e.g., FIG. 2) that is connected to and pulled behind the toolbar 12. In some embodiments, the cart 24 may be integrated with the toolbar 12 and form part of the toolbar 12. Regardless, the cart 24 may be connected to or integrated with the center section 14 of the toolbar 12 via a connection assembly that is described in more detail below. In addition to nutrient applicators, it is contemplated that the implement 10 may carry other types of tools 13, such as seed applicators, fertilizer applicators, pesticide applicators, tillage tools (e.g., coulters, harrows, finishing reels, etc.), or the like.

Remaining with FIG. 1, the implement 10 may be connectable to a prime mover, such as a tractor (not shown), via a hitch assembly 30. Although the term "tractor" is used herein in place of the term prime mover, it should be understood that the prime mover may include various types of machines capable of pulling the implement for operational purposes and for transport. The hitch assembly 30 may comprise an elongated draw-bar 32 that is connected to a front side of the center section 14 of the toolbar 12 via a connection assembly that provides an up-down pivot connection 34 (referred to herein as an "up-down pivot" 34). As such, the draw-bar 32 extends forward from the toolbar 12 and includes a coupler 36 at its front end. The coupler 36 is configured to connect with the tractor via various types of connections (e.g., via connection with a three-point hitch of the tractor). As such, the implement 10 is configured to be pulled across the ground via power provided by the tractor. As will be discussed in more detail below, the draw-bar 32 may be telescopically extendable, such that the draw-bar 32 is configured to extend forward from and to retract rearward toward the toolbar 12.

Relational and/or directional terms, such as "above", "below", "up", "upper", "upward", "down", "downward", "lower", "top", "bottom", "outer", "inner", "front", "forward," "back", "rear", "rearward", "left", "leftward," "right", "rightward", etc., along with orientation terms, such as "horizontal", "vertical", "lateral", and "longitudinal" may be used throughout this description. These terms retain their commonly accepted definitions and are used with reference to embodiments of the technology and the positions, directions, and orientations thereof shown in the accompanying figures. For example, with reference to FIG. 1, the front of the implement 10 is shown in the lower left corner of the figure towards the coupler 36 of the draw-bar 32, while the rear of the implement 10 is shown in the upper right corner of the figure at the tank 22. Embodiments of the technology may be positioned and oriented in other ways or move in other directions. Therefore, the terms do not limit the scope of the current technology. It is further noted that the normal direction of travel of the implement 10 during operation is from the upper right corner of FIG. 1 toward the lower left corner.

Turning to the toolbar 12 in more detail, each of the left wing section 16 and the right wing section 18 may be coupled with the center section 14 via a connection assembly that comprises a front-to-back pivot connection 40 (referred to herein as "front-to-back pivots" 40) and an up-down pivot connection 42 (referred to herein as "up-down pivots" 42), as illustrated in FIG. 3. The front-to-back pivots 40 allow each of the wing sections 16, 18 to shift about the vertical axes presented by the font-to-back pivots 40 between operational and transport positions. More generally, the front-to-back pivots 40 allow each of the wing sections 16, 18 to shift through a range of motion within a generally horizontal plane (though the plane need not be exactly horizontal) from the rearward operational position to a forward transport position. In the operational position, as illustrated in FIGS. 1-5, the left and right wing sections 16, 18 extend generally laterally from the center section 14, such that the tools 13 supported underneath the toolbar 12 can engage with the ground, e.g., to form a plurality of rows into which nutrients can be deposited as the implement 10 is pulled across a field by the tractor. As such, in the operational position, the toolbar 12 extends generally perpendicular to a direction of travel of the implement 10. FIGS. 6-9 illustrate the toolbar 12 of the implement 10 transitioning between the operating and transport positions, while FIGS. 10-14 illustrated the toolbar 12 in the transport position. As illustrated, in the transport position, the wing sections 16, 18 of the toolbar 12 extend forward, generally parallel with a direction of travel of the implement 10. In the transport position, the width of the implement 10 is less than the width of the implement in the operational position, thereby enhancing the compactness of the implement 10 to provide for efficient transportation of the implement 10.

In the transport position, the left and right wings sections 16, 18 are folded forward (about the front-to-back pivots 40) with respect to the center section 14 until the wing sections 16, 18 extend in a generally longitudinal direction, forward from the center section 14 and in general alignment (e.g., parallel and/or adjacent) with the draw-bar 32. Thus, the toolbar 12 of the present invention may be considered a front-folding toolbar. From the transport position, the left and right wings sections 16, 18 may be unfolded rearward (about the front-to-back pivots 40) with respect to the center section 14 until the wing sections 16, 18 extend generally laterally from the center section 14 in the operational position. Such forward/rearward shifting of the wing sections 16, 18 about the front-to-back pivots 40 may be facilitated via actuators 45 (e.g., hydraulic cylinders) that extend between the center section 14 and each of the wing sections 16, 18, as illustrated in FIG. 3.

Figure 8:
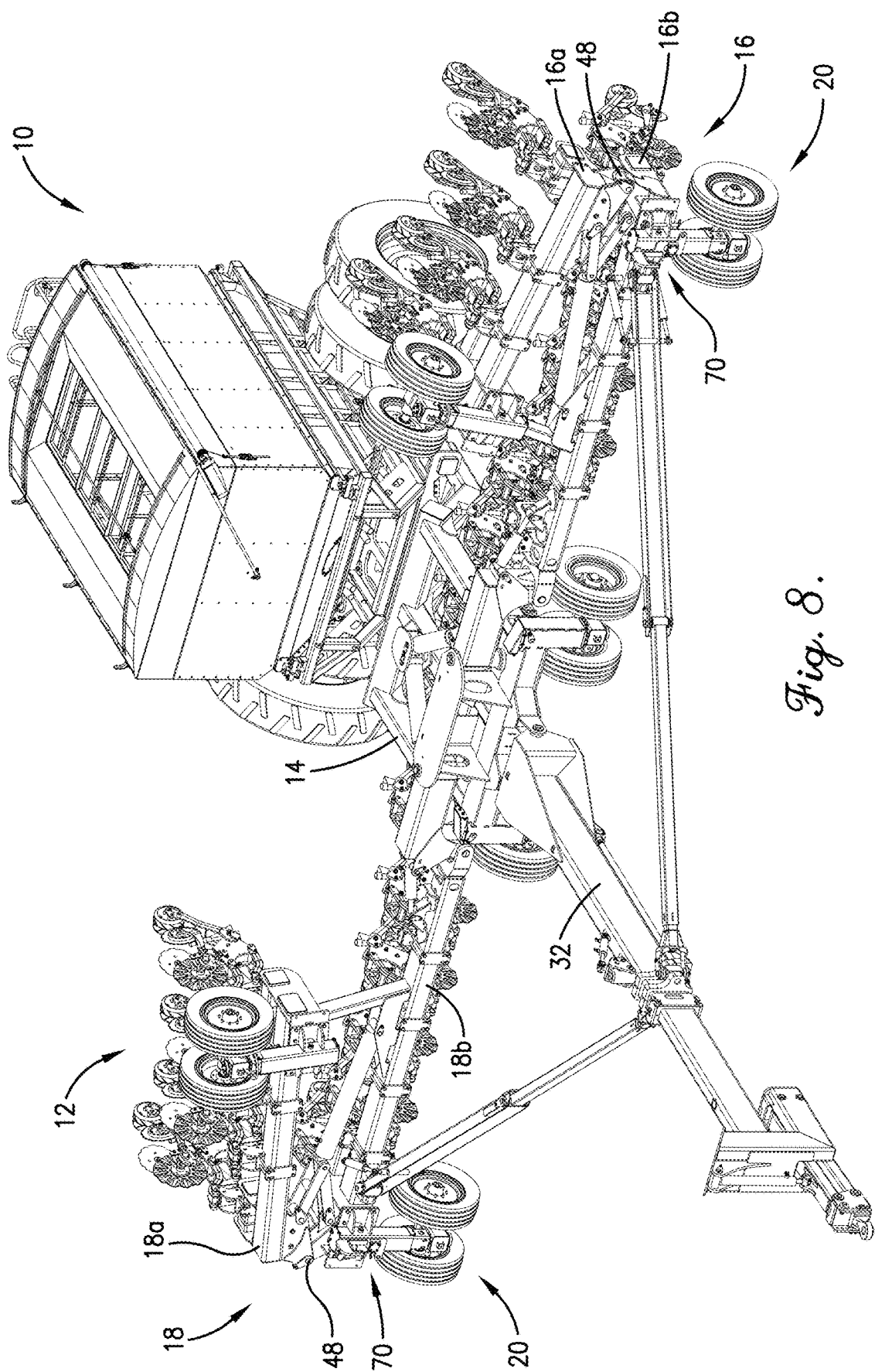
FIG. 8 is another front perspective view of the implement from FIGS. 3-7, illustrating the toolbar transitioning from the operational position to the transport position.
Figure 9:
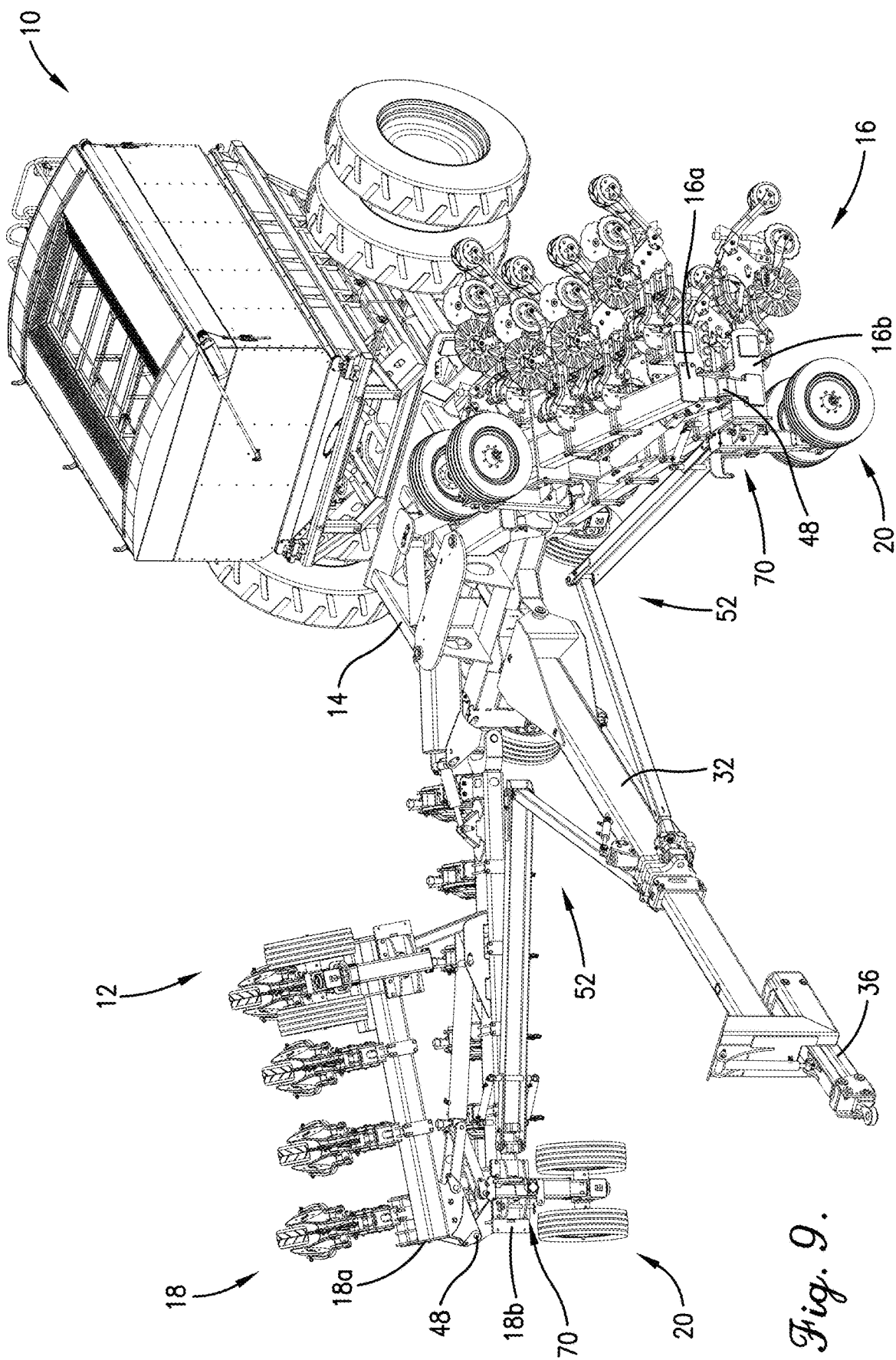
FIG. 9 is another front perspective view of the implement from FIGS. 3-8, illustrating the toolbar transitioning from the operational position to the transport position.
Figure 10:
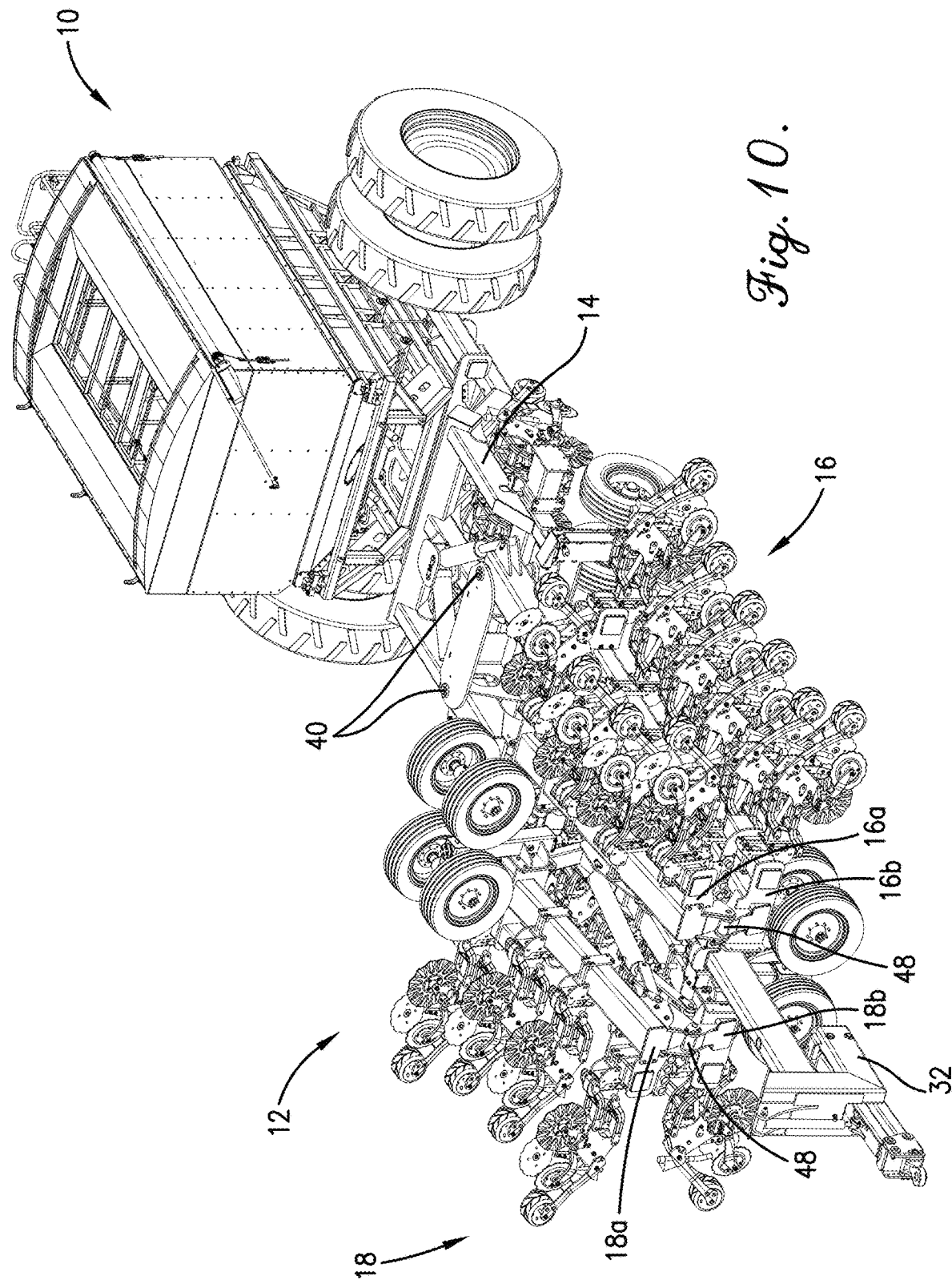
FIG. 10 is a front perspective view of the implement from FIGS. 3-8, illustrating the toolbar in the transport position.
Figure 11:
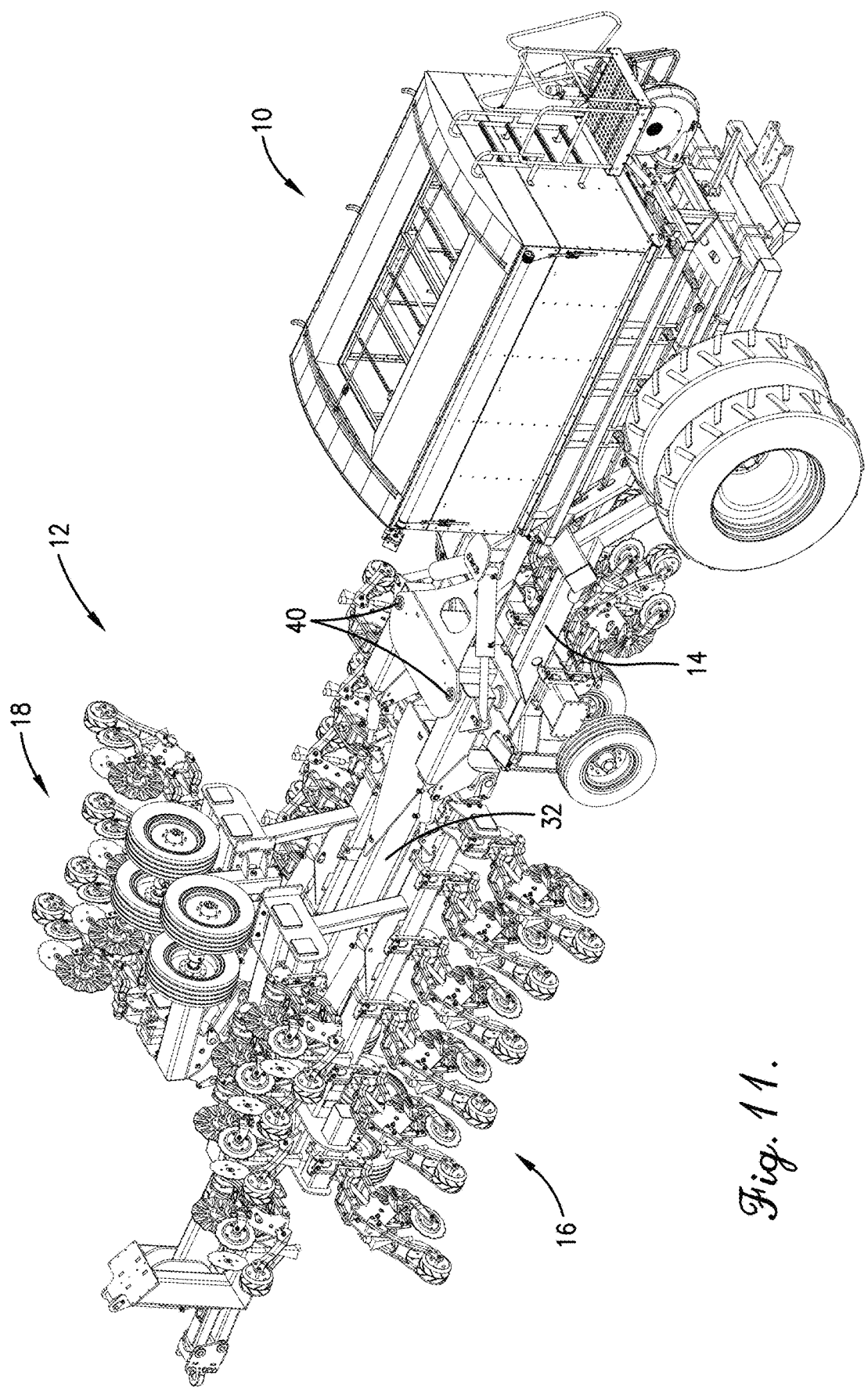
FIG. 11 is a rear perspective view of the implement from FIG. 10.

In some embodiments, each of the left and right wing sections 16, 18 may be comprised of two or more portions (e.g., an outer portion 16a, 18a and an inner portion 16b, 18b) that fold about a secondary pivot connection 48 (referred to herein as "secondary pivots" 48), as illustrated in FIGS. 6-9. The secondary pivot 48 allows one of the portions of the wing section 16, 18 (e.g., the outer portions 16a, 18a) to shift vertically with respect to the other of the portions of the wing sections 16, 18 (e.g., the inner portions 16b, 18b) about horizontal axes presented by the secondary pivots 48. Thus, as illustrated in FIG. 10, when the wing sections 16, 18 are shifted forward to the transport position, the outer portions 16a, 18a can be folded up on top of the inner portions 16b, 18b to form stacks and to provide for further compactness of the wing sections 16, 18 and the toolbar 12 of the implement 10 more generally. Such folding of the individual portions 16a, 16b, 18a, 18b of the wing sections 16, 18 may be accomplished via actuators 50 (e.g., hydraulic cylinders) that extend between the portions 16a, 16b, 18a, 18b of the wing sections 16, 18, as illustrated in FIG. 3. Specifically, one actuator 50 may extend between the portions 16a, 16b of the left wing section 16, while one actuator 50 may extend between the portions 18a, 18b of the right wing section 18. Regardless, even with the portions 16a, 16b, 18a, 18b of the wing sections 16, 18 folded on top of each other, when the toolbar 12 is in the transport position, the wing sections 16, 18 remain in an orientation that extends forward from the center section 14 of the toolbar 12, as shown in FIG. 10.

Figure 4:
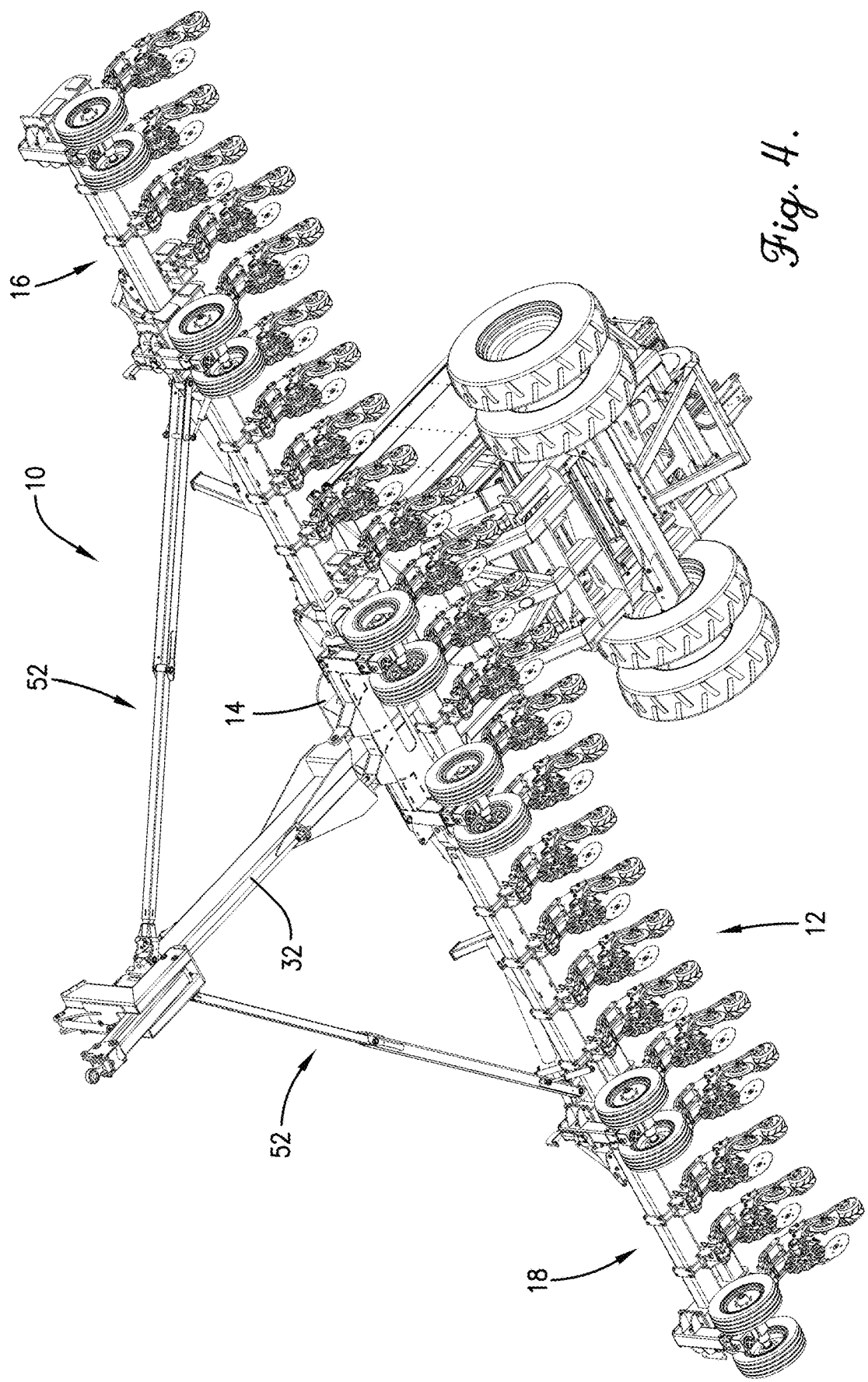
FIG. 4 is a bottom perspective view of the implement of FIG. 3.

Furthermore, as also illustrated in FIG. 3, in some embodiments, the implement may include support linkages 52, which extend from a front portion of the draw-bar 32 to each of the left and right wing sections 16, 18 of the toolbar 12. Such support linkages 52 may aid in providing support to the wing sections 16, 18 when in the operational position and when transitioning between the operational and transport positions. The support linkages 52 may each be pivotally secured to the front end of the draw-bar 32 and pivotally secured to one of the left or right wing sections 16, 18. In additional embodiments, each of the support linkages 52 may comprise two halves that are pivotally secured to each other near the center of the support linkage 52. As such, the support linkages 52 are configured to be fully extended and generally rigid when the toolbar 12 is in the operational position (so as to provide support to the wing sections 16, 18 as shown in FIGS. 3 and 4), and to collapse into alignment with the wing sections 16, 18 and the draw-bar 32 when the wing sections 16, 18 have shifted forward when the toolbar 12 is in the transport position. The support linkages 52 collapsing is perhaps best illustrated in FIG. 9 where the toolbar 12 is transitioning from the operational position to the transport position. The support linkages 52 may be aided in extending and collapsing (as the toolbar 12 transitions between operational and transport position) via one or more actuators 54 (e.g., hydraulic cylinders) that extend between each of the left and right wing sections 16, 18 and one of the support linkages 52, as shown in FIG. 3. When the wing sections 16, 18 are in the operational position, the support linkages 52 will generally be fully extended, in a rigid manner, between the draw-bar 32 and the wing sections 16, 18. And the actuators 54 may function to aid in maintaining the support linkages 52 in such an extended position.

Figure 15:
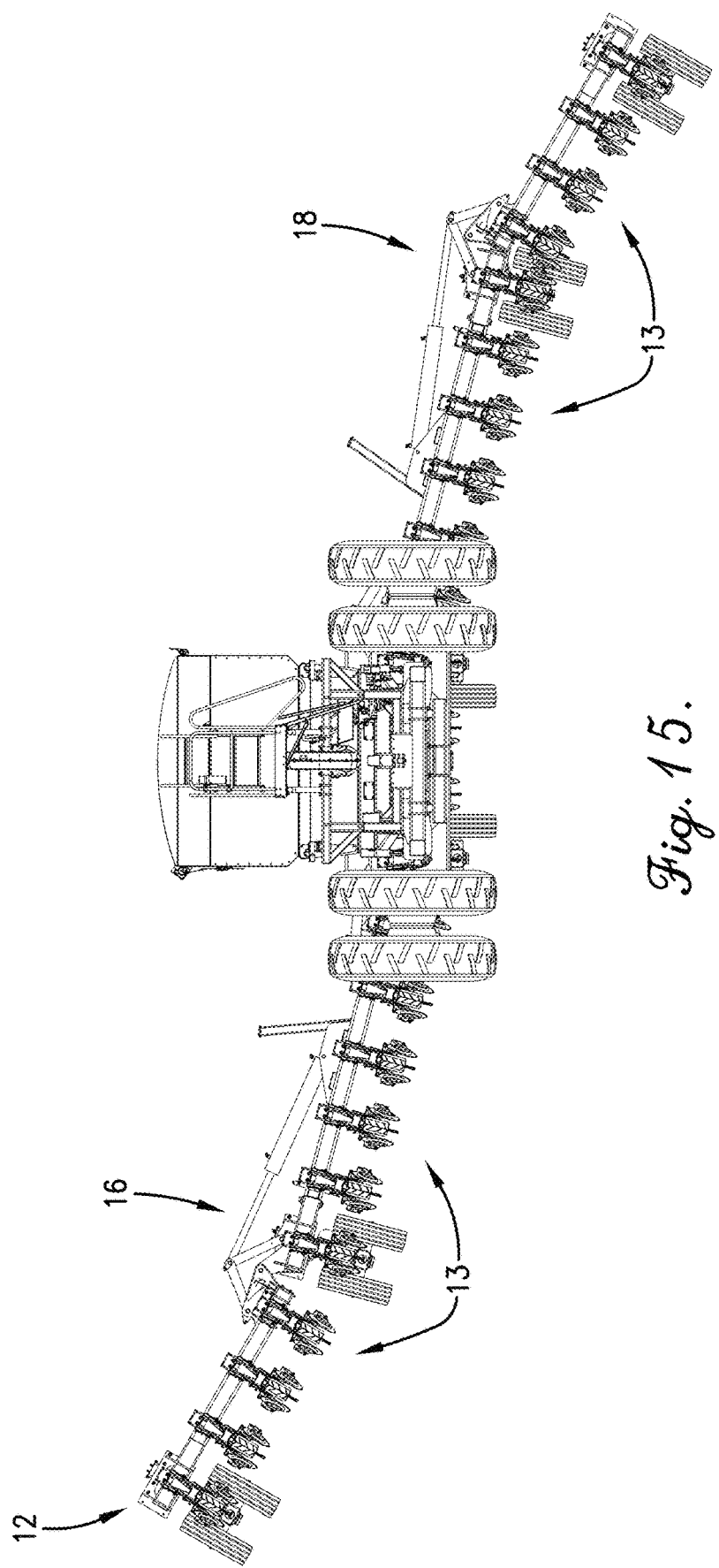
FIG. 15 is a rear elevation view of the implement of FIGS. 3-5, illustrating left and right wing sections of the toolbar being raised and lowered to follow contours of a ground surface.
Figure 16:
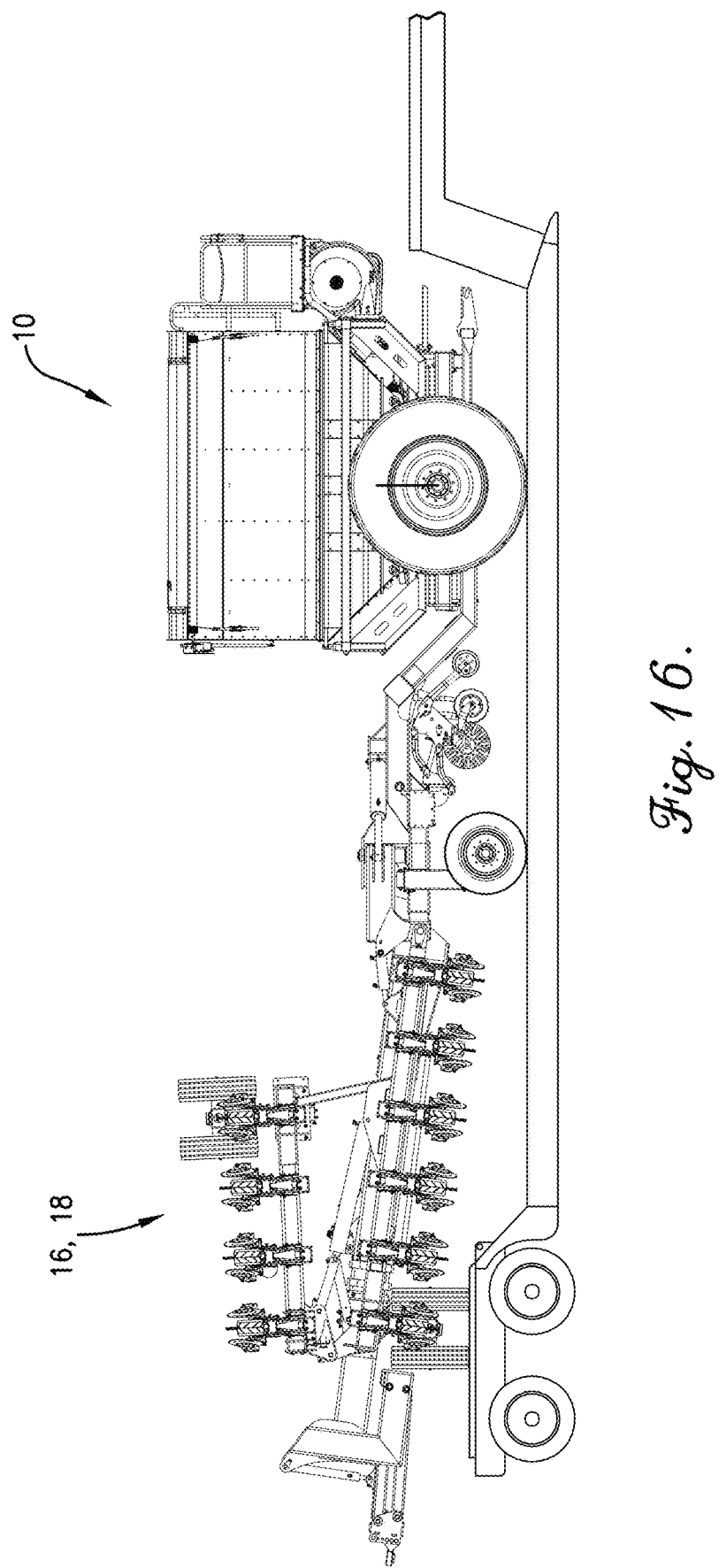
FIG. 16 is a side elevation view of the implement from FIGS. 10-14, illustrating the implement loaded onto a trailer and illustrating wing sections of the toolbar and a draw-bar of the implement vertically rotated, together in unison, upward to properly fit on the trailer.

Returning to the up-down pivots 42, as shown in FIG. 3, such pivots allow each of the wing sections 16, 18 of the toolbar 12 to shift vertically about a generally horizontal axis presented by the up-down pivot 42 with respect to the center section 14. In the operational position, as illustrated in FIG. 15, the wing sections 16, 18 can, thus, be raised and lowered (e.g., via rotation about the up-down pivots 42) so as to cause the tools 13 supported on the toolbar 12 to be positioned at the necessary height/depth with respect to the ground for appropriate operations. In the transport position, as illustrated in FIG. 16, the wing sections 16, 18 can be raised and lowered (e.g., via rotation about the up-down pivots 42) so as to facilitate efficient transport without placing undue stresses and strain on the implement 10 and/or on the tractor. Such vertical shifting about the up-down pivots 42 may arise naturally due to forces of movement as the tractor and/or implement 10 travel over the ground. However, in some other embodiments, the vertical shifting of the wing sections 16, 18 may be accomplished via actuators 46 (e.g., hydraulic cylinders), as shown in FIG. 3, that extend to each of the wing sections 16, 18 from other portions of the implement 10 (e.g., from the center section 14 of the toolbar 12 and/or from connection assemblies associated with the wing sections 16, 18 themselves).

Returning to FIG. 1, the figure illustrates the connection assembly used to couple the draw-bar 32 to the center section 14 of the toolbar 12, thus forming the up-down pivot 34. As illustrated, the up-down pivot 34 comprises a laterally-extending pivot connection that allows the draw-bar 32 to rotate and shift its position vertically (with respect to the toolbar 12) about a laterally-extending rotational axis "A." Such an up-down pivot 34 is beneficial because it allows the draw-bar 32 to rotate vertically with respect to the toolbar 12, such that the tractor can be spaced apart from the toolbar 12 in a front-to-back direction and positioned at different elevations than the toolbar 12 (and to transition, separately between different elevations) without placing unwanted strains and stresses on the implement 10 (e.g., on the toolbar 12 or on the hitch assembly 30) and/or on the tractor. Thus, for example, because the draw-bar 32 is permitted to vertically rotate about the up-down pivot 34, the tools 13 extending from below the toolbar 12 can accurately follow the contours of the ground, even while the tractor (being positioned ahead of the toolbar 12) is on a separate area of the ground that has the same elevation as the toolbar 12 (e.g., FIG. 17), a higher elevation than the toolbar 12 (e.g., FIG. 18), or a lower elevation than the toolbar 12 (e.g., FIG. 19). Furthermore, the up-down pivot 34 between the hitch assembly 30 draw-bar 32 and the toolbar 12 permits the draw-bar 32 and/or the tractor to function without being required to support the full weight of various components of the implement 10, such as the toolbar 12 and/or the tank 22 and associated cart 24. Instead, the weight of the toolbar 12 and/or the tank/cart 22, 24 can be supported by their own respective wheels.

Figure 12:
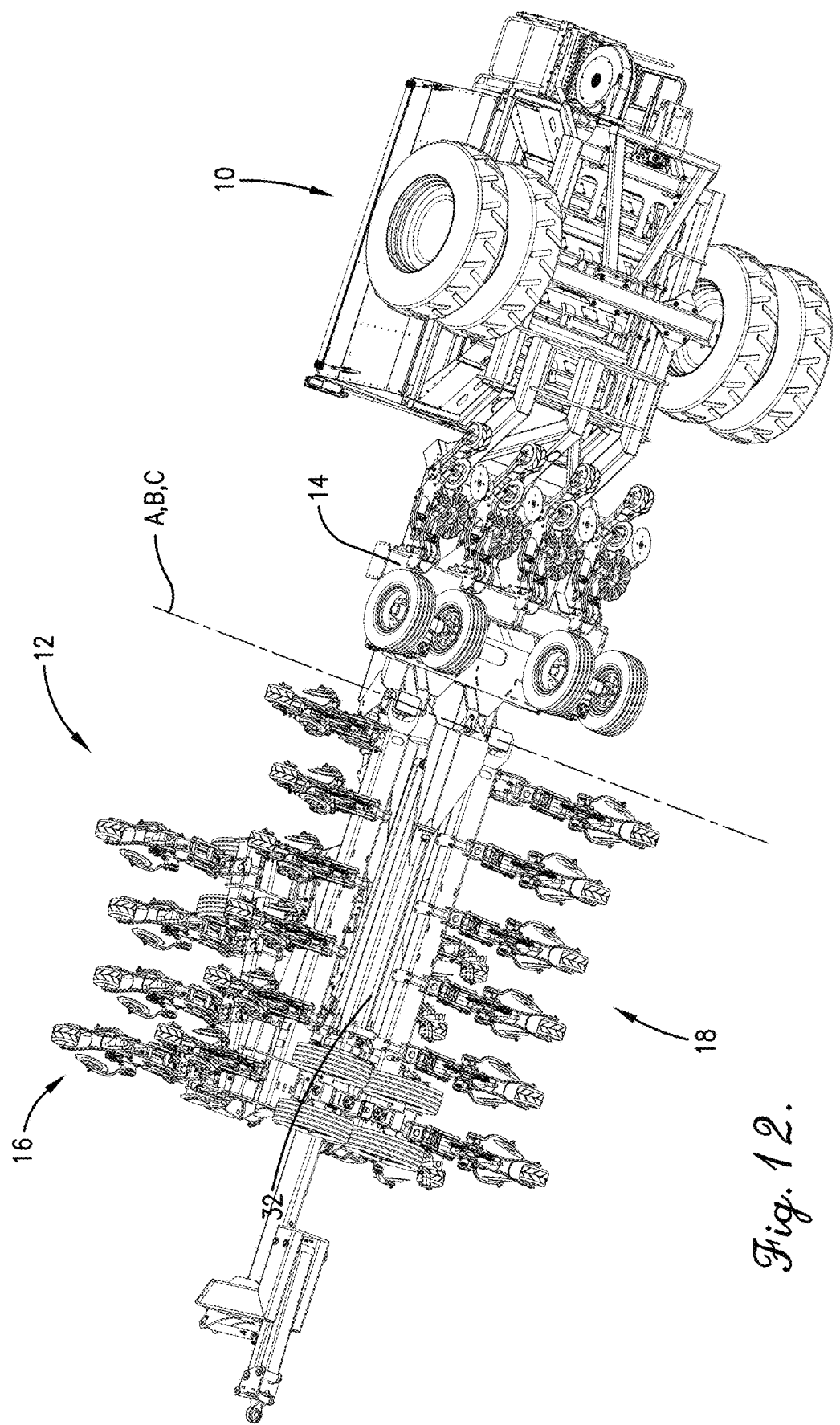
FIG. 12 is a bottom perspective view of the implement from FIGS. 10 and 11.
Figure 13:
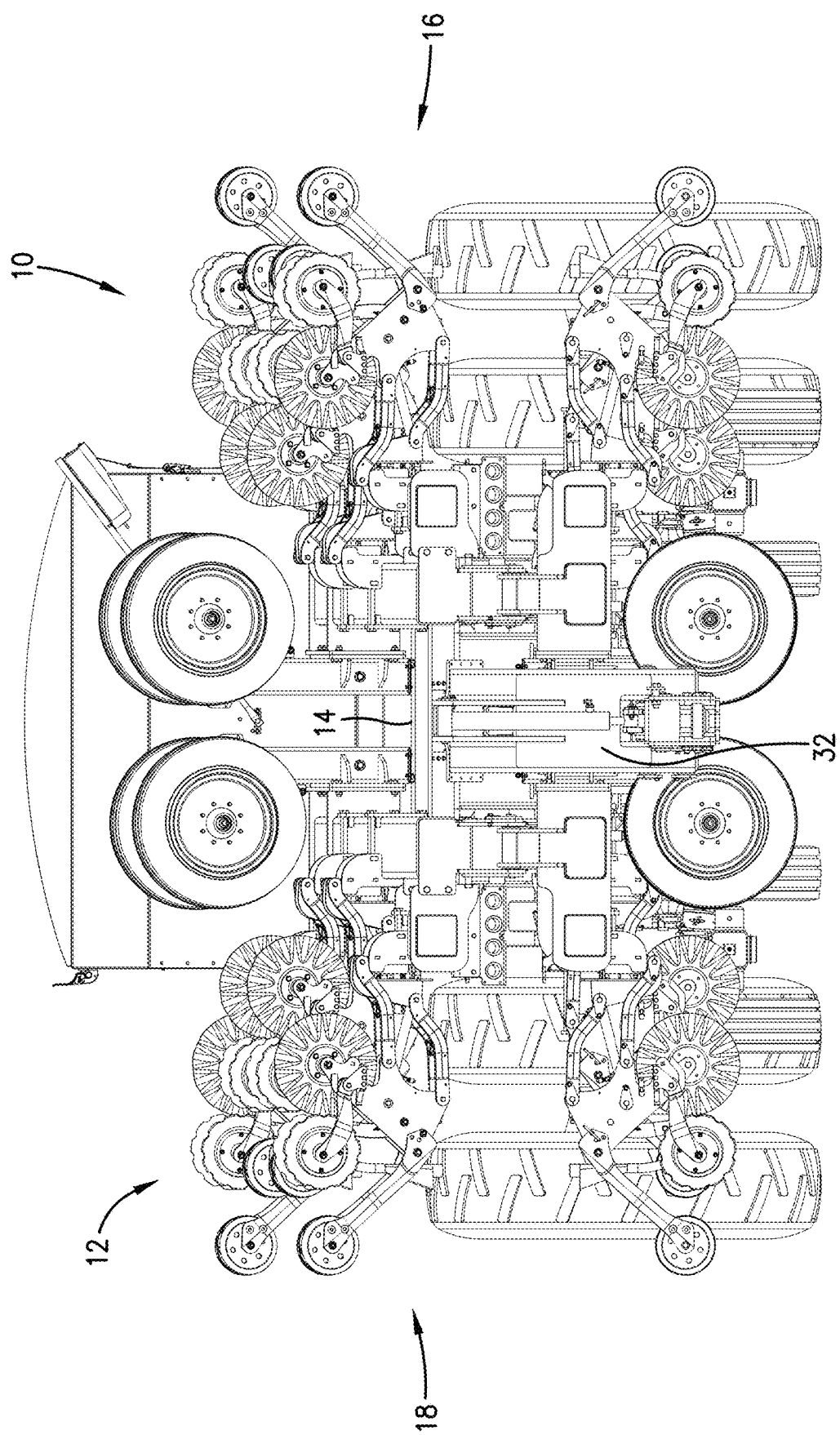
FIG. 13 is a front elevation view of the implement from FIGS. 10-12.

The figures illustrate another beneficial feature of the relationship between (i) the up-down pivot 34 connecting the draw-bar 32 and the toolbar 12, and (ii) the up-down pivots 42 that provide relative rotation between the wing sections 16, 18 of the toolbar 12 and the center section 14. In certain embodiments, as illustrated in FIG. 1 the laterally-extending rotational axis A of the up-down pivot 34 between the draw-bar 32 and the center section 14 of the toolbar 12 may lie in the same plane as rotational axes B and C presented by the up-down pivots 42 respectively between the left and right wing sections 16, 18 and the center section 14 of the toolbar 12. With the toolbar 12 in the operational position (with the wing sections 16, 18 extending laterally outward from the center section 14), the rotational axes B and C presented by the up-down pivots 42 extend generally longitudinally (in a front-to-back direction), whereas rotational axis A presented by the up-down pivot 34 extends generally laterally (in a side-to-side direction). Nevertheless, such rotational axes A, B, and C may extend generally within a common plane, which may in some embodiments be a horizontal plane. Correspondingly, when the toolbar 12 is shifted to the transport position (i.e., with the left and right wing sections 16, 18 extending forward from the center section 14) as illustrated in FIG. 12, the rotational axes A, B, and C of the up-down pivots 34, 42 may continue to extend generally within a common plane. However, the rotational axes A, B, and C may each extend generally laterally, and furthermore, may generally be aligned such that the rotational axes A, B, and C extend generally collinearly. Such a configuration beneficially permits the left and right wing sections 16, 18 to move vertically in unison with the draw-bar 32 as necessary during transport (i.e., the wing sections 16, 18 and the draw-bar 32 can rotate vertically about the rotational axes A, B, and/or C, which may be colinear). As such, the left and right wing sections 16, 18 can be at least partially supported by the draw-bar 32 when in the transport position (e.g., via the support linkages 52) without structural interferences occurring as the tractor and/or the implement 10 move during transport. Although in some embodiments, the rotational axes A, B, and/or C may be colinear, in other embodiments, the rotational axes A, B, and/or C may not be colinear but may be parallel. Thus, it is understood that in some embodiments, the rotational axes A, B, and/or C may be somewhat offset from each other, but the wing sections 16, 18 and the draw-bar 32 may still be configured to move vertically in unison with each other when in the transport position.

Figure 17:
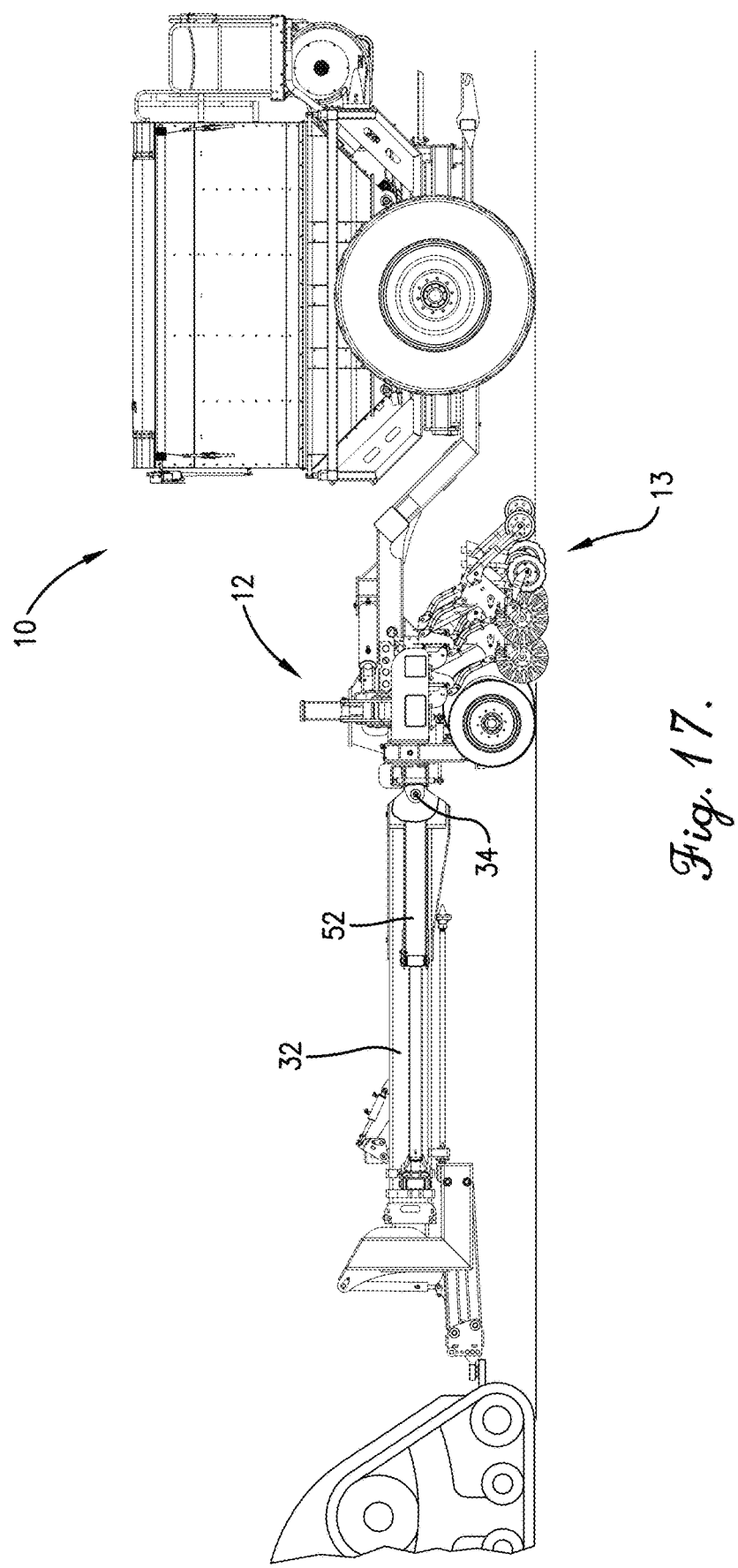
FIG. 17 is a side elevation view of the implement from FIGS. 3-5, with a prime mover illustrated pulling the implement over a relatively flat ground surface.
Figure 18:
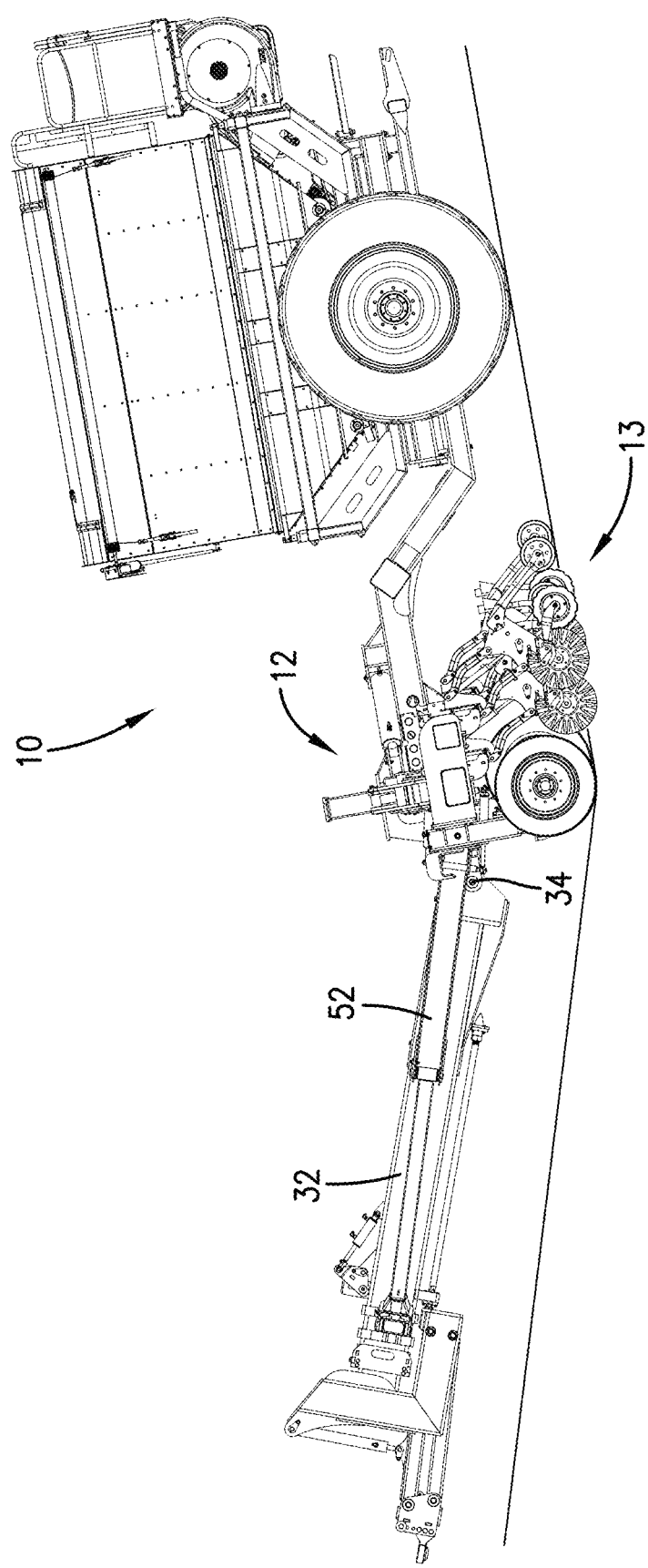
FIG. 18 is a side elevation view of the implement from FIGS. 3-5, with the implement travelling over a declining ground surface.
Figure 19:
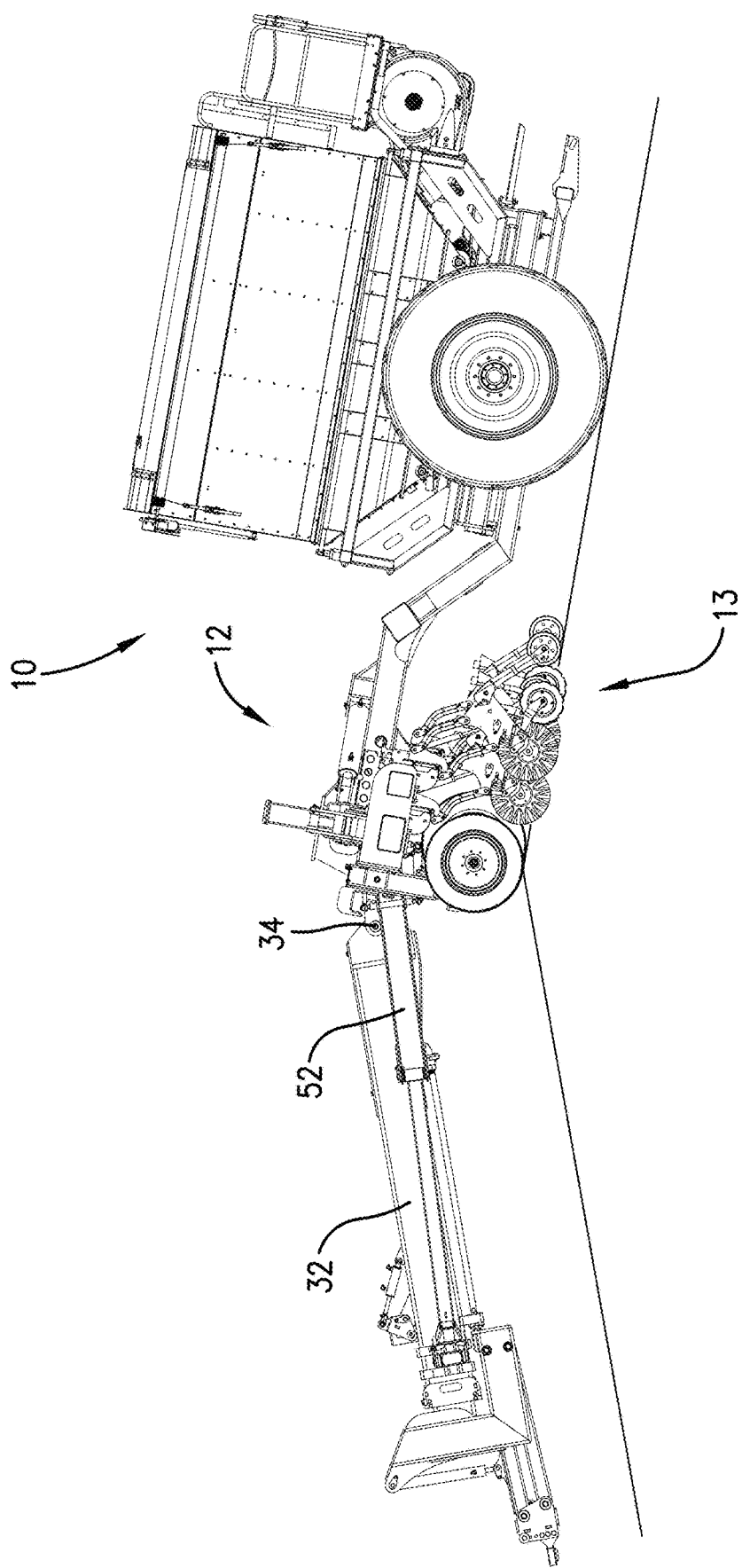
FIG. 19 is a side elevation view of the implement from FIGS. 3-5, with the implement travelling over an inclining ground surface.

Furthermore still, the relationship between (i) the up-down pivot 34 between the draw-bar 32 and the toolbar 12, and (ii) the front-to-back pivots 40 between the left and right wing sections 16, 18 and the center section 14 of the toolbar 12, beneficially permits the components of the implement 10 to shift, as needed, during operation. For example, with reference to FIG. 3, during operation (i.e., with the toolbar 12 in the operational position), the draw-bar 32 may need to rotate vertically (e.g., upward and/or downward) about the laterally-extending rotational axis "A" of the up-down pivot 34 between the draw-bar 32 and the center section 14 of the toolbar 12 (See FIG. 1 that illustrates the rotational axis "A"). However, because the support linkages 52 extend generally rigidly between the draw-bar 32 and the wing sections 16, 18, such upward/downward movement of the draw-bar 32 could put unwanted stresses/strains on the support linkages 52 and/or on the toolbar 12 if were not for the front-to-back pivots 40 between the left and right wing sections 16, 18 and the center section 14 of the toolbar 12. Such front-to-back pivots 40 permit the wing sections 16, 18 to move forward and/or rearward as the draw-bar 32 moves upward and/or downward. For example, if during operation of the implement 10, the tractor encounters an inclined surface, as shown in FIG. 18, the draw-bar 32 may be rotated upward as the tractor is positioned vertically higher than the toolbar 12. During such upward rotation, the support linkages 52 may pull the left and right wing sections 16, 18 forward. Correspondingly, upon the draw-bar rotating back downward to its normal position, as shown in FIG. 17, the support linkages 52 may push the left and right wing sections 16, 18 rearward to their normal operational positions.

Thus, embodiments of the present invention, and particularly (i) the up-down pivot 34 between the draw-bar 32 and the center section 14 of the toolbar 12, and (ii) the front-back pivots 40 between the wing sections 16, 18 and the center section 14 of the toolbar 12, permit the draw-bar 32 to shift upward/downward during operation of the implement 10, while the wing sections 16, 18 are permitted to correspondingly shift forward/rearward. Such functionality is provided even with the presence of the rigid support linkages 52 that provide support between the draw-bar 32 and the wing sections 16, 18.

As was noted previously, each of the left and right wing sections 16, 18, as well as the center section 14, of the toolbar 12 may be supported on the ground by wheel assemblies 20. In some embodiments, the wheel assemblies 20 supporting the center section 14 may include actuators (e.g., hydraulic cylinders) for raising and lowering the center section 14 with respect to the ground. Thus, the wheel assemblies 20 of the center section may be used to (i) control the operating height of the toolbar 12 (and/or the operating depth of the tools 13) when in the operational position, and (ii) control the ground clearance of the implement 10 when the toolbar 12 is in the transport position. Generally, the wheel assemblies 20 of the center section 14 will also be configured to rotate (or castor) so as to follow necessary directional movements when the implement 10 is operating or being transported.

Figure 20:
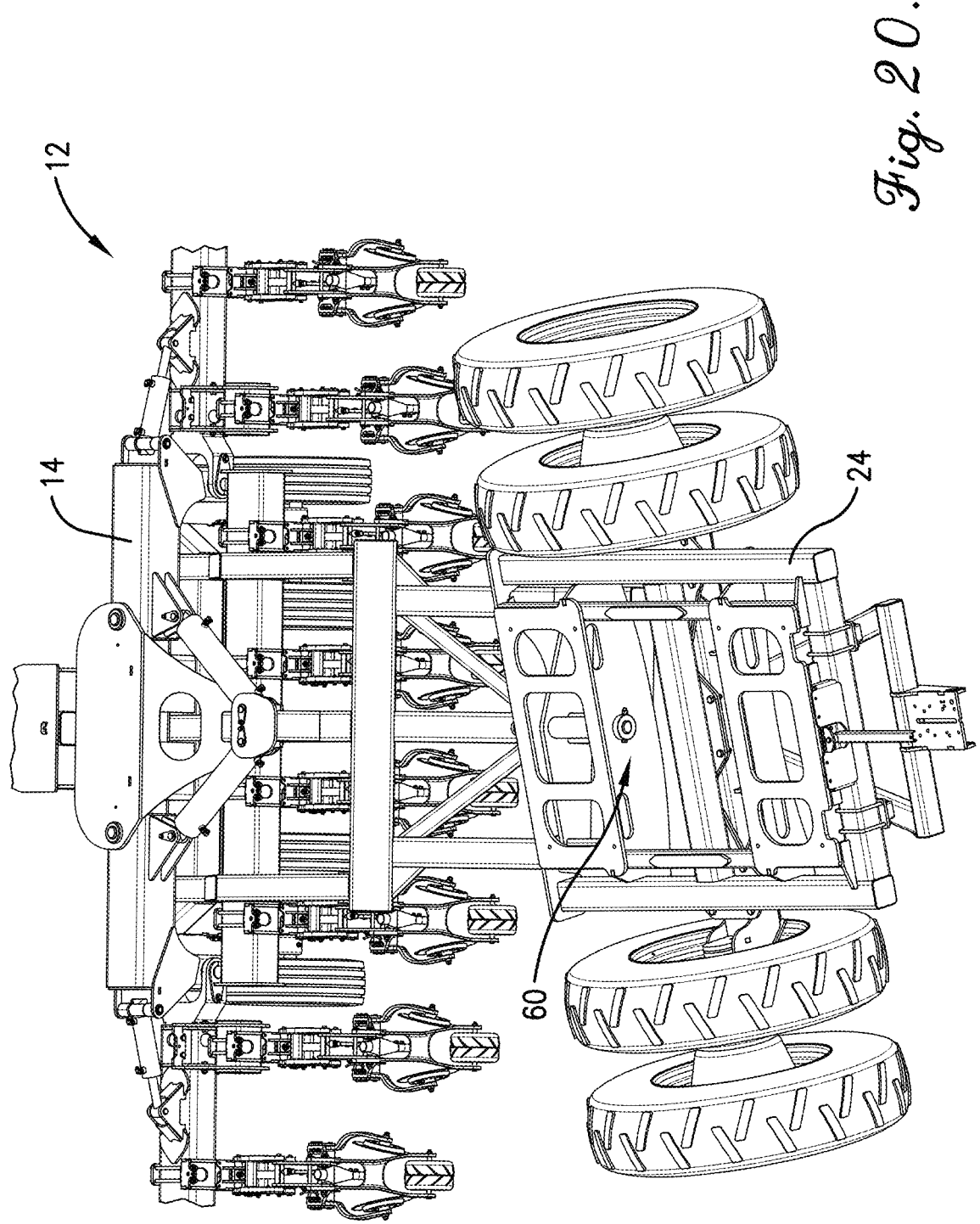
FIG. 20 is a rear perspective view of a portion of the implement from FIGS. 3-5, with a tank removed from a cart to illustrate the cart being configured to rotate with respect to a center section of the toolbar.
Figure 21:
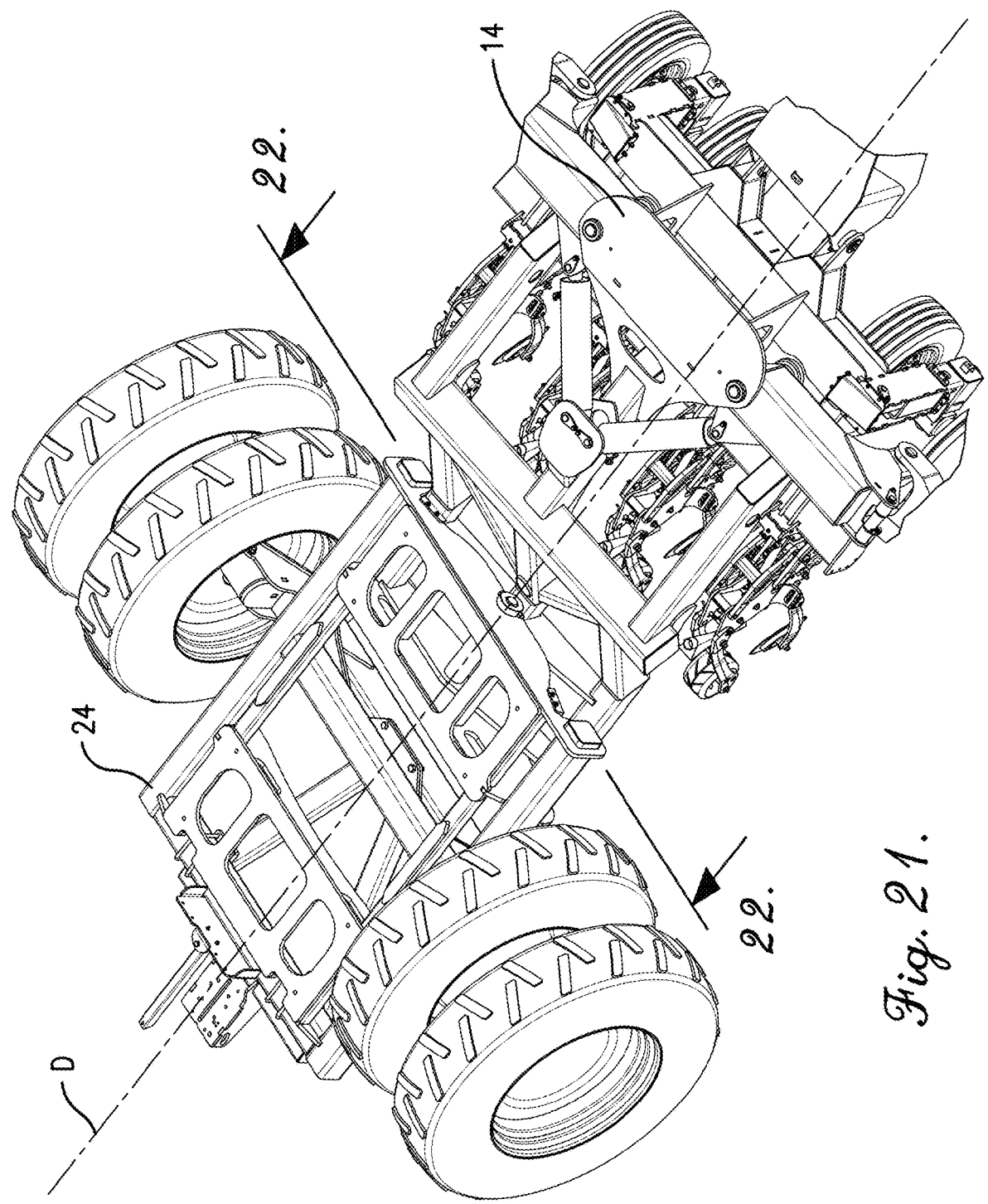
FIG. 21 is top perspective view of the implement from FIG. 20.
Figure 22:
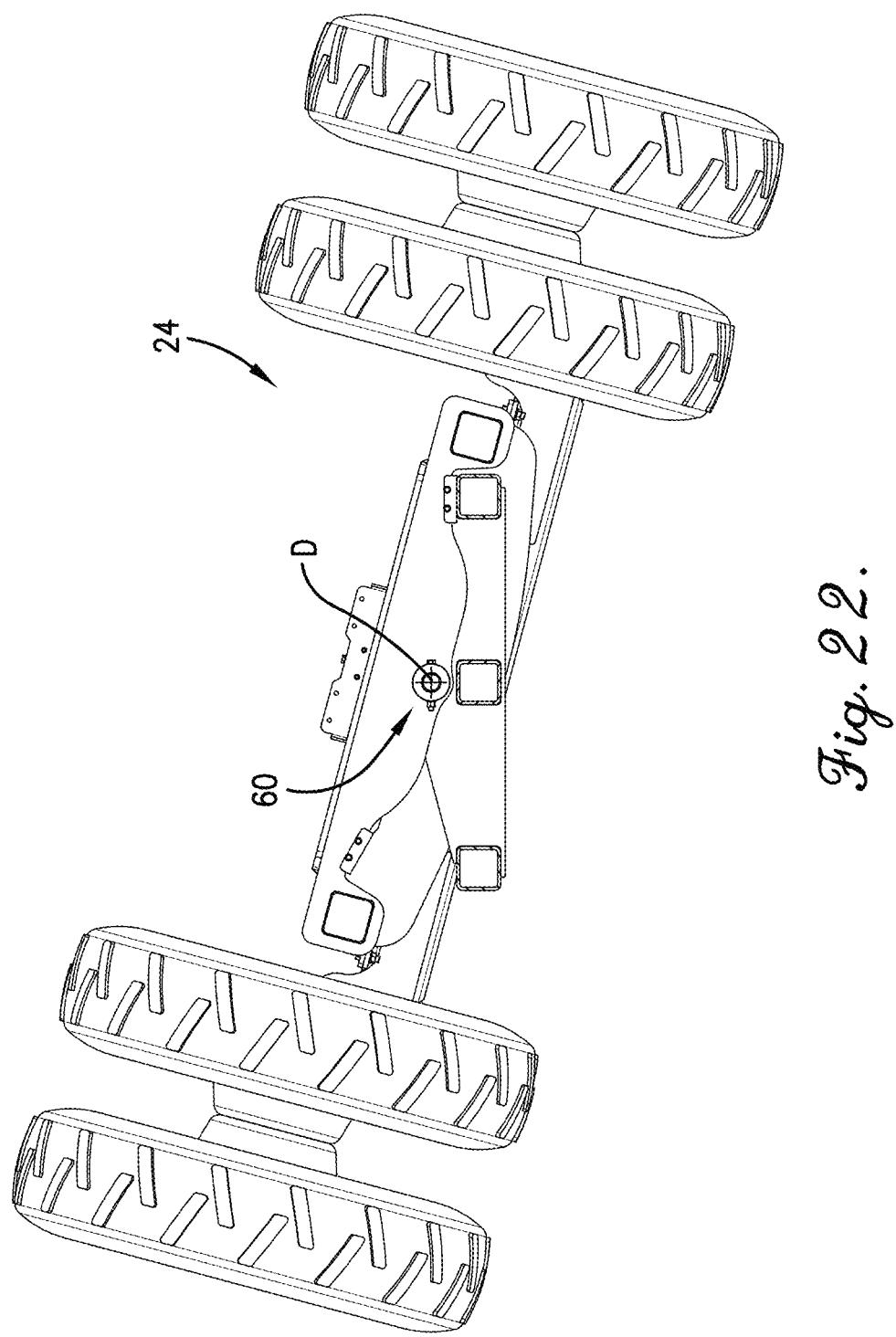
FIG. 22 is a cross section of the implement from FIGS. 20 and 21 taken along the line 22-22 from FIG. 21.

Finally, the cart 24 that supports the tank 22 may be connected to and/or integrated with the center section 14 of the toolbar via a connection assembly 60, as shown in FIG. 20. As such, the cart 24 may form part of the toolbar 12. Regardless, the connection assembly 60 may present a longitudinally extending rotational axis "D," as illustrated in FIGS. 21 and 22, about which the cart/tank 24, 22 can rotate relative to the center section 14 of the toolbar 12. The connection assembly 60 allows the center section 14 of the toolbar 12 and the cart 24 to rotate independently of each other about such longitudinal axis D so that each component can more precisely follow the contours of the ground, as shown in FIG. 23. As illustrated in the drawings, the cart 24 may include its own wheels for supporting the cart 24 and the tank 22 on the ground. However, in some embodiments, such wheels may be replaced by endless-loop tracks.

Figure 5:
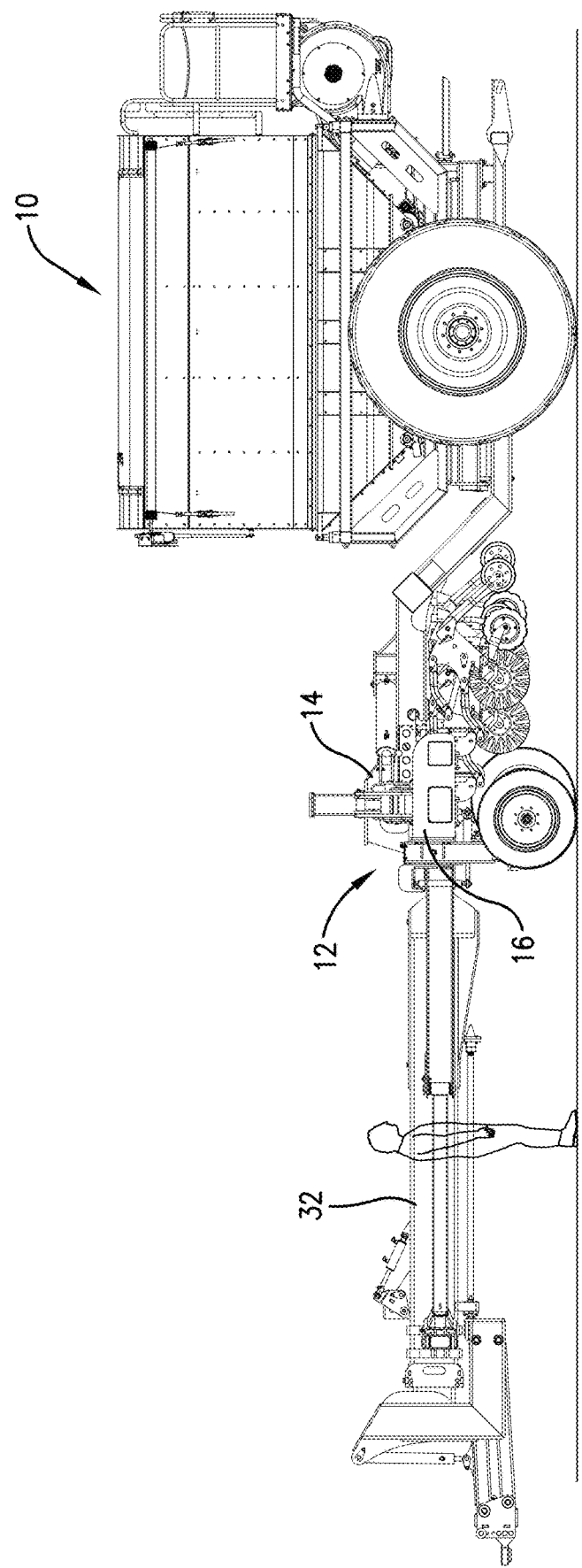
FIG. 5 is a side elevation view of the implement from FIGS. 3 and 4, with an outline of a six-foot tall human standing next to the implement to illustrate the size of the implement.
Figure 6:
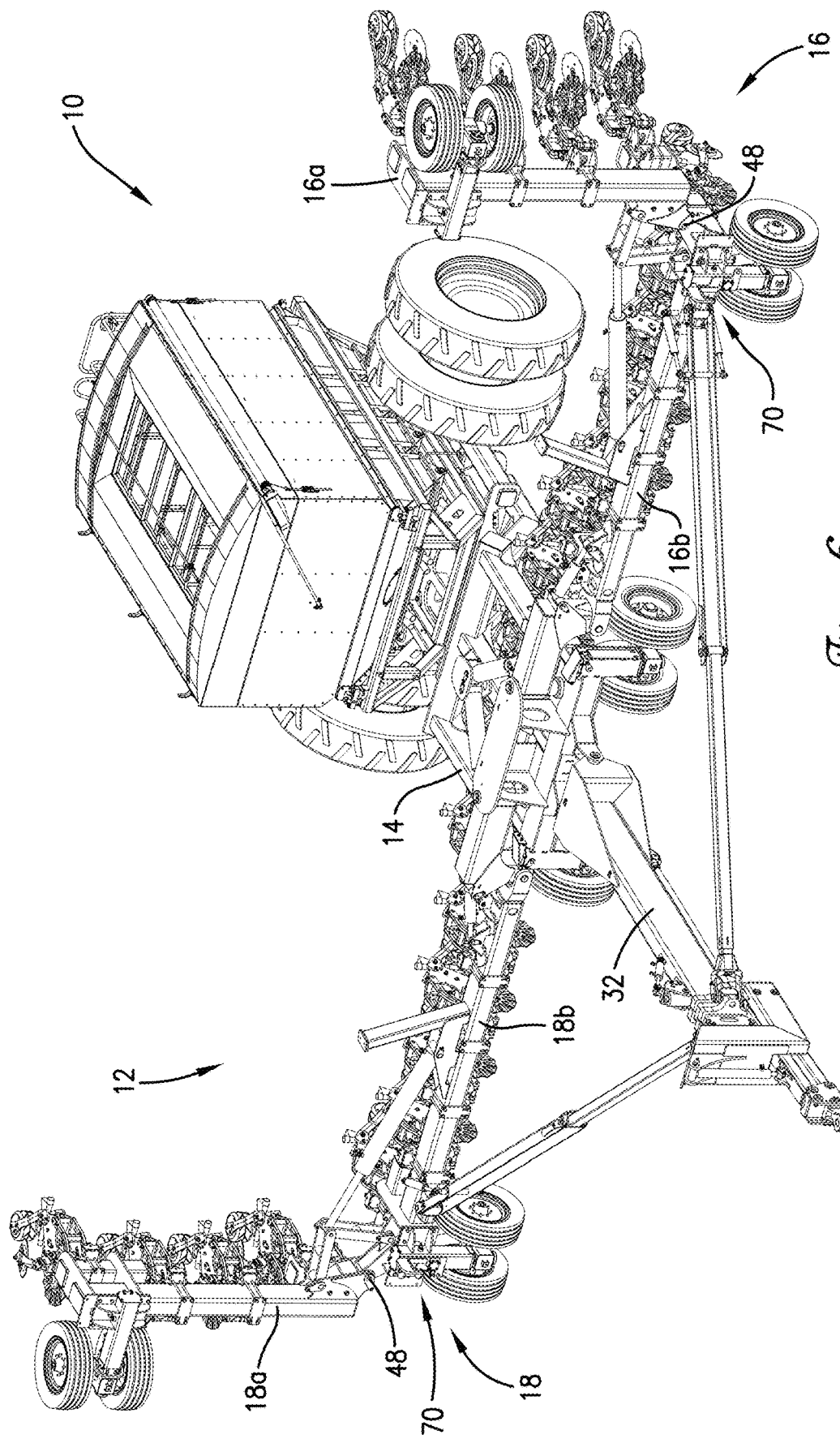
FIG. 6 is a front perspective view of the implement from FIGS. 3-5, illustrating the toolbar transitioning from the operational position to a transport position.
Figure 7:
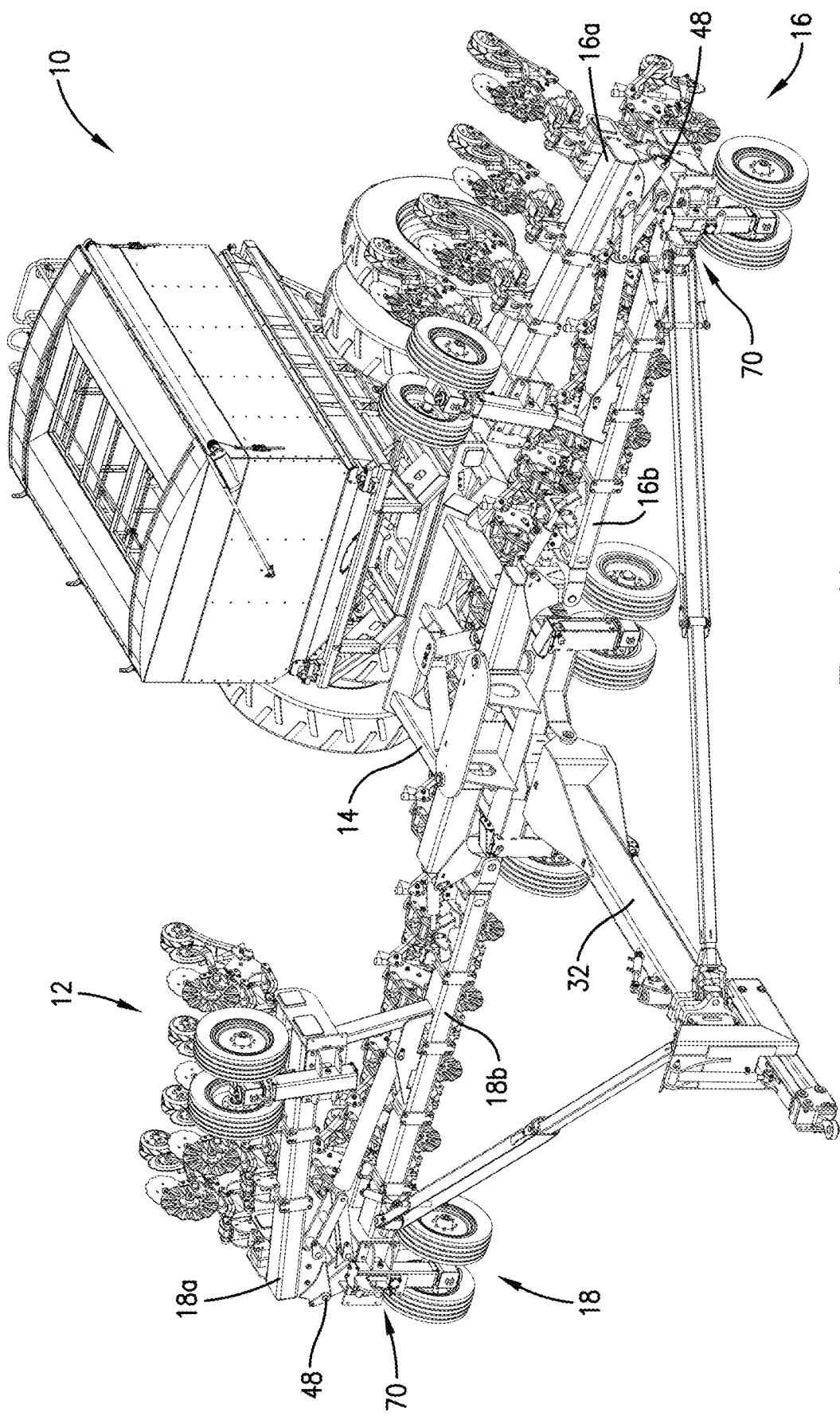
FIG. 7 is another front perspective view of the implement from FIGS. 3-6, illustrating the toolbar transitioning from the operational position to the transport position.
Figure 14:
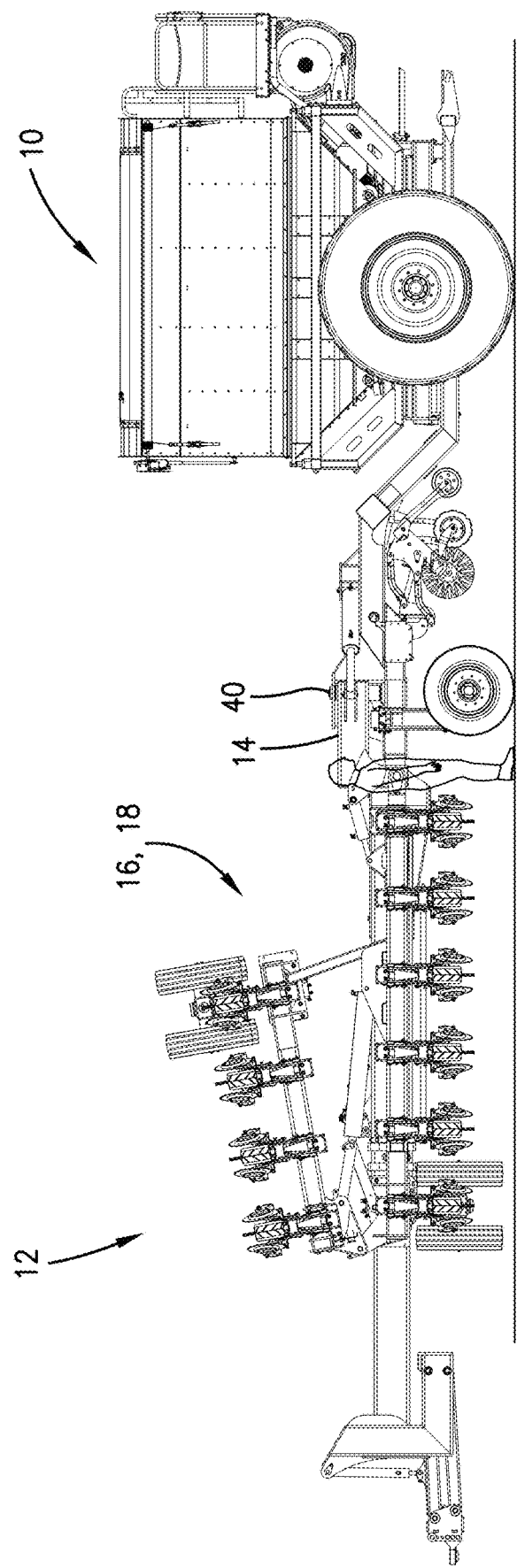
FIG. 14 is a side elevation view of the implement from FIGS. 10-13, with an outline of a six-foot tall human standing next to the implement to illustrate the size of the implement.

In view of the above, the implement 10 according to embodiments of the present invention is particularly configured to perform agricultural operations in an efficient manner over various terrains (e.g., flat terrain, rolling terrain, undulating terrain, steep terrain, etc.). The efficient operation is facilitated by the components of the implement 10 described above, including (i) the up-down pivot 34 between the draw-bar 32 and the center section 14 of the toolbar 12, (ii) the up-down pivots 42 that provide vertical rotation between the wing sections 16, and 18 and the center section 14 of the toolbar 12, (iii) the front-to-back pivots 40 between the wing sections 16, and 18 and the center section 14 of the toolbar 12, (iv) the connection assembly 60 between the cart 24 and the center section 14 of the toolbar 12, (v) the support linkages 52 between the draw-bar 32 and the center section 14 of the toolbar 12, (vi) as well as other components of the implement 10. Beneficially, such efficient operation is achieved despite the significant size and weight of the implement 10. For example, various components of the implement 10 (e.g., the toolbar 12, the hitch assembly 30, the cart 24, etc.) may be formed from heavy material, such as steel, iron, or other material with high strength and durability. Furthermore, the weight of the implement 10 can be significantly increased when multiple tools 13 are attached to the toolbar 12, and/or when the tank 22 is supported on the cart 24 (particularly when the tank 22 is loaded with seed, nutrients, fertilizer, pesticide, or the like). In some embodiments, the weight of the implement 10 may be from 40,000 to 80,000 pounds, from 50,000 to 70,000 pounds, or about 60,000 pounds. Furthermore, the implement 10 may have a width, when in the operational position, of between 40 and 80 feet, between 50 and 70 feet, or about 60 feet. The implement 10 may have a length between 20 and 60 feet, between 30 and 50 feet, or about 40 feet. The implement 10 may have a height (without the tank 22 and with the toolbar 12 in the operational position) of between 5 and 10 feet, between 6 and 8 feet, or about 7.5 feet. The implement 10 may have a height (without the tank 22 and with the toolbar 12 in the transport position) of between 6 and 14 feet, between 8 and 13 feet, or about 12 feet. The implement 10 may have a height (with the tank 22) of between 5 and 15 feet, between 6 and 14 feet, or about 13 feet. FIGS. 5 and 14 illustrate the implement 10 in comparison to a height of an average six-foot tall human.

As such, the implement 10 may be used in the following manner. A plurality of tools 13 may be attached to the toolbar 12, such that the implement 10 may perform agricultural operations. Such tools 13 may be row units in the form of nutrient applicators, seed applicators, fertilizer applicators, pesticide applicators, tillage tools, etc. Nevertheless, it should be understood that the tools 13 may comprise various other types of agricultural tools. The implement 10 may be connected with a prime mover by engaging a coupler 36 of a draw-bar 32 with the prime mover. It is noted that the draw-bar 32 extends forward from the toolbar 12. With the toolbar 12 in an operational position such that left and right wing sections 16, 18 of the toolbar extend generally laterally from a center section 14 of the toolbar 12, the implement 10 may be pulled through a field using the prime mover to perform agricultural operations. Once such agricultural operations are complete, the toolbar 12 may be shifted from the operational position to a transport position such that the left and right wing sections 16, 18 extend generally forward from the center section 14 of the toolbar 12. With the toolbar 12 in the transport position, the implement 10 may be pulled using the prime mover to transport the implement 10 to a different location. Notably, when the implement 10 is being pulled or otherwise transported in the transport position, each of the left and right wing sections 16, 18 and the draw-bar 32 are configured rotate vertically (in unison) with respect to the center section 14 of the toolbar 12.

When the implement 10 is being used with the toolbar 12 in the operational position (e.g., and being pulled by a tractor through a field), the up-down pivots 42 that provide vertical rotation between the wing sections 16, 18 and the center section 14 of the toolbar 12 permit the wing sections 16, 18 to rotate vertically upward and downward with respect to the center section 14 so as to follow generally any type of terrain shape of the ground (e.g., see FIG. 15). The secondary pivots 48 between the outer and inner portions of the wing sections 16, 18 may provide further flexibility for the wing sections 16, 18 follow the contours of the ground. In addition to permitting the wing sections 16, 18 (or portions thereof) to rotate vertically to follow the contours of the ground, the up-down pivots 42 and/or the secondary pivots 48 may be used to permit the wing sections 16, 18 (or portions thereof) to rotate to adjust the operating depths and/or down pressure of the tools 13 supported by the wing sections 16, 18. For example, the actuators 46 may be used to raise and/or lower the wing sections 16, 18 with respect to the center section 14 about the up-down pivots 42 so as to, respectively, decrease and/or increase the operating depths and/or down pressure of the tools 13 supported by the wing sections 16, 18. The actuators 50 may be similarly used to raise and/or lower the outward portions 16b, 18b of the wing sections 16, 18 with respect to the inner portions 16a, 18a about the secondary pivots 48 so as to, respectively, decrease and/or increase the operating depths and/or down pressure of the tools 13 supported by the outward portions 16b, 18b of the wing sections 16, 18. It should be understood that the actuators 46, 50 may form portions of a hydraulic system of the implement 10. The hydraulic system may be controlled by a control system that functions automatedly and/or that functions based on inputs from an operator of the implement 10. For example, the tractor used to pull the implement 10 may include a user interface, with which the operator of the implement 10 can provide instructions to actuate the actuators 46, 50 to adjust positions of the wing sections 16, 18.

In addition, when the implement 10 is being used with the toolbar 12 in the operational position (e.g., and being pulled by a tractor through a field), the hitch assembly 30, which includes the draw-bar 32 and its coupler 36 is free to rotate vertically about the connection assembly between the draw-bar 32 and the center section 14 of the toolbar 12. Such a connection assembly includes the up-down pivot 34. As a result, the implement 10 can follow the contours of the ground even when the implement 10 is positioned at a different elevation than the tractor pulling the implement 10 via the draw-bar 32 (see, e.g., FIG. 17-19). Such rotational freedom of the draw-bar 32 prevents unwanted stresses and strains on the draw-bar 32 (or the coupler 34) or the tractor pulling the implement 10 via the draw-bar 32. Instead of requiring that the draw-bar 32 or the tractor to support the weight of the implement 10, the rotational freedom of the draw-bar 32 permits the weight of the toolbar 12 to be supported by its own wheels 20 (and for the weight of the tank 22 and/or cart 24 to be supported by its own wheels).

Similarly, the connection assembly 60 between the cart 24 and the center section 14 of the toolbar 12 permits the tank 22 and the cart 24 to rotate about the longitudinal axis D with respect to the toolbar 12 so as to reduce stresses and strains between the tank and cart 22, 24 and the toolbar 12 (see, e.g., FIGS. 20-23). Instead, of requiring that toolbar 12 and/or the tank and cart 22, 24 support each other's weight (or portions thereof) during operation, the rotational freedom between the toolbar 12 and the tank and cart 22, 24 permits the weight of the toolbar 12 to be supported by its own wheels 20 and for the weight of the tank 22 and/or cart 24 to be supported by its own wheels.

Remaining with the toolbar 12 in the operational position, the support linkages 52 extending between the draw-bar 32 and the wing sections 16, 18 are used to provide additional support the wing sections 16, 18. Because the support linkages 52 are generally rigid when supporting the wing sections 16, 18 in the operational position, upward and/or downward rotation of the draw-bar 32 may be inhibited by or may impose unwanted stresses or strains on the support linkages 52 and/or on the wing sections 16, 18. Beneficially, however, the such potential stresses or strains are prevented by the front-to-back pivots 40. Specifically, if the draw-bar 32 is raised about the up-down pivot 34, the support linkages 52 will be correspondingly raised and will pull/rotate the wing sections 16, 18 forward about the front-to-back pivots 40. When the draw-bar 32 is lowered (from the preceding raised position) about the up-down pivot 34, the support linkages 52 will be correspondingly lowered and will push/rotate the wing sections 16, 18 rearward about the front-to-back pivots 40. As such, the unwanted stresses or strains on the support linkages 52 and/or on the wing sections 16, 18 can be reduced during operation of the implement 10. As was described previously, the actuators 54 may be used to assist in maintaining the support linkages 52 in the extended position, as well as aiding in collapsing the 52 the support linkages when the wing sections 16, 18 are shifted to the transport position. Such actuators 54 may form part of the implement's 10 hydraulic system that is controlled by the control system described above.

Finally, when the toolbar 12 is shifted to the transport position, such that the wing sections 16, 18 are generally aligned with the draw-bar 32, the alignment between the rotational axis A presented by the up-down pivot 34 (between the draw-bar 32 and the center section 14 of the toolbar 12) and the rotational axes B, C presented by the up-down pivots 42 (between the wing sections 16, 18 and the center section 14 of the toolbar 12) permit the draw-bar 32 and the wing sections 16, 18 to rotate vertically together in unison. Such simultaneous rotation of the draw-bar 32 and the wing sections 16, 18 reduce interferences, stresses, and strains between components of the implement 10 as the implement 10 is being pulled/transported by a tractor (or otherwise being transported when disconnected from the tractor).

Furthermore, in some embodiments, the draw-bar 32 and the wing sections 16, 18 will be engaged with each other when the toolbar 12 is in the transport position, such that the draw-bar 32 may provide additional support to the collapsed wing sections 16, 18. In such a configuration, the ability of the draw-bar 32 and the wing sections 16, 18 to rotate in unison will facilitate the ability of the draw-bar 32 to provide support to the wing sections 16, 18 even when the draw-bar 32 rotates. In more detail, a front side of each the wing sections 16, 18 may include a support element 70, such as a hook illustrated in FIGS. 6-8, that is configured to engage with the draw-bar 32 when the wing sections 16, 18 are in the transport position. For example, with the outer portions 16a, 18a folded on top of the inner portions 16b, 18b, the wheels 20 of the inner portions 16b, 18b may be extended, as shown in FIGS. 8 and 9, so as to partly raise the wing sections 16, 18. At the same time, the draw-bar 32 may be telescopically extended forward. As a result, when the wing sections 16, 18 are rotated forward to the transport position, the support elements 70 (e.g., the hooks) can engage over the extended draw-bar 32 to support the wing sections 16, 18 on the draw-bar, as shown in FIGS. 10-14. It is noted that the extension of the wheels 20 of the inner portions 16*b*, 18*b* allow the support elements 70 to be raised over the extended draw-bar 32, such that the support elements 70 can be engaged with the draw-bar 32. At such time, the wheels 20 of the wing sections 16, 18 may be retracted, such that the wing sections 16, 18 are lowered and supported on the draw-bar 32 (e.g., via the support elements 70).

As was described previously, the actuators 45 may be used to rotate the wing sections 16, 18 about the front-to-back pivots 40 from the operational position to the transport position. Such actuators 45 may form part of the implement's 10 hydraulic system that is controlled by the control system described above.

In view of the operations described above, certain specific benefits of the configuration of the implement 10 will not be described in more detail.

Having thus described one or more embodiments of the invention, what is claimed as new and desired to be protected by Letters Patent includes the following:

What is claimed is:

1. An agricultural implement configured to be propelled by a prime mover, said implement comprising:
    a toolbar configured to support a plurality of agricultural tools, wherein the toolbar is a front-folding toolbar configured to be shifted forward from an operational position to a transport position,
    wherein the toolbar comprises a left wing section, a right wing section, and a center section; and
    a draw-bar extending forward from the toolbar and configured to be coupled with the prime mover, wherein the draw-bar is rotatably connected with the toolbar via a connection assembly that presents a generally laterally extending rotational axis, such that the draw-bar is configured to rotate vertically about the rotational axis with respect to the center section of the toolbar,
    wherein the left and right wing sections are configured to rotate vertically with respect to the center section about respective rotational axes, wherein the rotational axes of the wing sections lie in a common plane with the rotational axis about which the draw-bar rotates vertically with respect to the center section of the toolbar,
    wherein when the toolbar is in the transport position, the left and right wing sections extend forward from the center section of the toolbar, and the rotational axes of the left and right wing sections are colinear with the rotational axis about which the draw-bar rotates vertically with respect to the center section of the toolbar.

2. The agricultural implement of claim 1, wherein in the operational position, the toolbar extends generally perpendicular to a direction of travel of the agricultural implement, and wherein in the transport position, at least a portion of the toolbar extends generally parallel to a direction of travel of the agricultural implement.

3. The agricultural implement of claim 1, wherein when the toolbar is in the transport position, the left and right wing sections extend forward from the center section of the toolbar and are in general alignment with the draw-bar, and wherein the left and right wing sections are configured to rotate vertically in unison with the draw-bar.

4. The agricultural implement of claim 1, wherein each of the left wing section, the right wing section, and the center section is supported on the ground by separate wheels, and wherein at least the wheels of the center section are configured to raise and lower the toolbar with respect to the ground.

5. The agricultural implement of claim 4, wherein at least the wheels of the center section are configured to castor.

6. The agricultural implement of claim 1, wherein the plurality of agricultural tools is selected from one or more of the following: seeding tools, nutrient applicators, pesticide applicators, fertilizer applicators, and tillage tools.

7. The agricultural implement of claim 6, wherein the plurality of agricultural tools is selected from one or more of the following: seeding tools, nutrient applicators, pesticide applicators, and fertilizer applicators, and wherein the agricultural implement further comprises a tank to hold agricultural products to be deposited into or onto the ground by the agricultural tools.

8. The agricultural implement of claim 7, wherein the tank is supported on the ground by a cart, and wherein the cart includes its own wheels or tracks.

9. The agricultural implement of claim 8, wherein the cart is connected to the toolbar via a cart connection assembly that permits the cart to rotate with respect to the toolbar.

10. The agricultural implement of claim 1, further comprising a support linkage extending between the draw-bar and the toolbar, wherein the support linkage is configured such that when the draw-bar rotates upward and/or downward, the support linkage causes a corresponding forward and/or rearward shifting of the toolbar when the toolbar is in the operational position.

11. An agricultural implement configured to be propelled by a prime mover, said implement comprising:
    a toolbar configured to support a plurality of agricultural tools, wherein the toolbar is a front-folding toolbar configured to be shifted forward from an operational position to a transport position,
    wherein the toolbar comprises a left wing section, a right wing section, and a center section, wherein each of the left wing section and the right wing section is configured to rotate vertically with respect to the center section about respective rotational axes; and
    a draw-bar extending forward from the toolbar and configured to be coupled with the prime mover, wherein the draw-bar is rotatably connected with the toolbar via a connection assembly that includes a generally laterally extending rotational axis, such that the draw-bar is configured to rotate vertically about the rotational axis with respect to the center section of the toolbar,
    wherein the rotational axes of the wing sections of the toolbar and the rotational axis about which the draw-bar rotates vertically with respect to the center section of the toolbar are colinear when the toolbar is in the transport position.

12. The agricultural implement of claim 11, wherein in the operational position, the toolbar extends generally perpendicular to a direction of travel of the agricultural implement, and wherein in the transport position, the left and right wing sections of the toolbar extend generally parallel to a direction of travel of the agricultural implement.

13. The agricultural implement of claim 11, wherein when the toolbar is in the transport position, the left and right wing sections extend forward from the center section of the toolbar and are in general alignment with the draw-bar, and wherein the left and right wing sections are configured to rotate vertically in unison with the draw-bar.

14. The agricultural implement of claim 11, wherein each of the left wing section, the right wing section, and the center section is supported on the ground by separate wheels, wherein at least the wheels of the center section are configured to raise and lower the toolbar with respect to the ground, and wherein at least the wheels of the center section are configured to castor.

15. The agricultural implement of claim 11, wherein the agricultural tools are selected from one or more of the following: seeding tools, nutrient applicators, pesticide applicators, fertilizer applicators, and tillage tools.

16. The agricultural implement of claim 15, wherein the agricultural tools are selected from one or more of the following: seeding tools, nutrient applicators, pesticide applicators, and fertilizer applicators, and wherein the agricultural implement further comprises a tank to hold agricultural products to be deposited into or onto the ground by the agricultural tools, wherein the tank is supported on the ground by a cart, wherein the cart includes its own wheels or tracks, and wherein the cart is connected to the toolbar via a cart connection assembly that permits the cart to rotate with respect to the toolbar.

17. A method of operating an agricultural implement comprising a toolbar supporting a plurality of tools and a draw-bar extending forward from the toolbar, said method comprising:
   (a) connecting the implement with a prime mover by engaging a coupler of the draw-bar with the prime mover;
   (b) pulling the implement through a field using the prime mover, wherein said pulling of step (b) is performed with the toolbar in an operational position such that left and right wing sections of the toolbar extend generally laterally from a center section of the toolbar;
   (c) shifting the toolbar from the operational position to a transport position such that the left and right wing sections extend generally forward from the center section of the toolbar; and
   (d) pulling the implement using the prime mover, wherein said pulling of step (d) is performed with the toolbar in the transport position, and wherein during said pulling of step (d), each of the left and right wing sections and the draw-bar are configured to rotate vertically with respect to the center section of the toolbar,
   wherein the left and right wing sections are configured to rotate vertically with respect to the center section about respective rotational axes, wherein the draw-bar is configured to rotate vertically with respect to the center section about a rotational axis,
   wherein during said pulling of step (d), the rotational axes of the left and right wing sections are colinear with the rotational axis about which the draw-bar rotates vertically with respect to the center section of the toolbar.

18. The method of claim 17, wherein when the toolbar is in the transport position, the left and right wing sections extend forward from the center section of the toolbar and are in general alignment with the draw-bar, and wherein the left and right wing sections are configured to rotate vertically in unison with the draw-bar.

19. The method of claim 17, wherein the plurality of tools is selected from one or more of the following: seeding tools, nutrient applicators, pesticide applicators, fertilizer applicators, and tillage tools.

20. The method of claim 19, wherein the plurality of agricultural tools is selected from one or more of the following: seeding tools, nutrient applicators, pesticide applicators, and fertilizer applicators, and wherein the implement further comprises a tank to hold agricultural products to be deposited into or onto the ground by the agricultural tools, wherein the tank is supported on the ground by a cart, wherein the cart includes its own wheels or tracks, and wherein the cart is connected to the toolbar via a cart connection assembly that permits the cart to rotate with respect to the toolbar.

* * * * *